United States Patent
Buchert et al.

(10) Patent No.: US 7,430,577 B2
(45) Date of Patent: Sep. 30, 2008

(54) COMPUTATIONALLY EFFICIENT MATHEMATICAL ENGINE

(75) Inventors: Ryan Samuel Buchert, Phoenixville, PA (US); Chayil S. Timmerman, Harleysville, PA (US); Stephan Shane Supplee, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 724 days.

(21) Appl. No.: 10/670,062

(22) Filed: Sep. 24, 2003

(65) Prior Publication Data
US 2004/0230632 A1 Nov. 18, 2004

Related U.S. Application Data

(60) Provisional application No. 60/413,164, filed on Sep. 24, 2002.

(51) Int. Cl.
G06F 7/38 (2006.01)
(52) U.S. Cl. .................................................. 708/524
(58) Field of Classification Search ................ 708/490, 708/524
See application file for complete search history.

(56) References Cited

U.S. PATENT DOCUMENTS

| | | | |
|---|---|---|---|
| 3,535,694 A | 10/1970 | Anacker et al. | |
| 4,811,210 A | 3/1989 | Maculay | |
| 4,872,131 A * | 10/1989 | Kubota et al. | 708/524 |
| 4,942,608 A | 7/1990 | Shigehara | |
| 5,179,531 A * | 1/1993 | Yamaki | 708/490 |
| 5,268,856 A * | 12/1993 | Wilson | 708/514 |
| 5,301,340 A * | 4/1994 | Cook | 712/24 |
| 5,974,435 A | 10/1999 | Abbott et al. | |
| 6,141,673 A | 10/2000 | Thayer et al. | |
| 6,298,366 B1 | 10/2001 | Gatherer et al. | |
| 6,317,770 B1 | 11/2001 | Lim et al. | |
| 6,334,176 B1 | 12/2001 | Scales, III et al. | |
| 6,366,937 B1 | 4/2002 | Shridhar et al. | |
| 6,401,194 B1 * | 6/2002 | Nguyen et al. | 712/210 |
| 6,526,430 B1 * | 2/2003 | Hung et al. | 708/523 |
| 6,530,010 B1 | 3/2003 | Hung et al. | |
| 6,922,716 B2 * | 7/2005 | Desai et al. | 708/524 |

FOREIGN PATENT DOCUMENTS

EP 0952516 10/1999

(Continued)

OTHER PUBLICATIONS

Catthoor et al., "Efficient Microcoded Processor Design for Fixed Rate DFT and FFT1", Journal of VLSI Signal Processing Systems For Signal, Image, and Video Technology, vol. 1, No. 4, Apr. 1, 1990, pp. 287-306.

(Continued)

*Primary Examiner*—Tan V Mai
(74) *Attorney, Agent, or Firm*—Volpe and Koenig, PC

(57) ABSTRACT

A method and system for performing many different types if algorithms utilizes a single mathematical engine such that the mathematical engine is capable of utilizing the same multipliers for all of the algorithms. The mathematical engine includes a selectively controlled parallel output register, at least one selectively controlled memory, and a plurality of processing elements. The output register, the memory and the processing elements are selectively controlled depending upon the algorithm to be performed.

24 Claims, 26 Drawing Sheets

FOREIGN PATENT DOCUMENTS

| | | |
|---|---|---|
| EP | 1335299 | 8/2003 |
| JP | 11306163 | 11/1999 |
| JP | 2001236496 | 8/2001 |
| JP | 2002202964 | 7/2002 |
| JP | 2002527808 | 8/2002 |
| WO | 00/22503 | 4/2000 |

OTHER PUBLICATIONS

Catthoor et al., "Efficient Microcoded Processor Design for Fixed Rate DFT and FFT1", Journal of VLSI Signal Processing Systems For Signal, Image, and Video Technology, vol. 1, No. 4, Apr. 1, 1990, pp. 287-306.

* cited by examiner

COMPUTATIONALLY EFFICIENT MATHEMATICAL ENGINE

CROSS REFERENCE TO RELATED APPLICATION

This application claims priority from U.S. provisional application No. 60/413,164 filed Sep. 24, 2002, which is incorporated by reference as if fully set forth.

FIELD OF INVENTION

The present invention relates to the utilization of a mathematical engine to calculate the output of an array of complex multipliers. More specifically, the present invention is a computationally efficient mathematical engine which is accessible to perform a plurality of mathematical calculations.

Modern wireless communication systems generally require an immense number of mathematical calculations to perform signal processing. Such calculations are generally performed by processors and application specific integrated circuits (ASICs).

Standard ASIC design for a receiver requires the implementation and calculation of many algorithms, which often require many parallel multiplications in order to complete the calculations during the allotted time. These algorithms typically consist of many matrix-to-matrix and matrix-to-vector multiplications and many discrete Fourier transform (DFT) and fast Fourier transform (FFT) calculations. Because multipliers take up alot of room on an ASIC, it is desirable to devise a solution which is capable of applying the same multipliers across the several algorithms.

Certain common calculations may be used to support a variety of current wireless technologies such as WCDMA, WTT, CDMA2000, 802.1X, TDSCDMA, FDD, TDD, and also other future system architectures not presently contemplated. One such type of calculation which is commonly performed is the dot product multiplication. Performing a dot-product calculation is a standard function as an operation between two matrixes. For example, dot product calculations are required for performing channel estimation and data estimation. In a Wide Band TDD System such calculations may include calculation of the prime factor fast Fourier transform (FFT), multiplication of a matrix by another matrix, multiplication of a matrix by its complex conjugate transpose, and a multiplication of a matrix by a vector.

In general, several dot product calculations must be performed by a single communication device, and therefore the communication device must have adequate processing power to support the required calculations. Presently, each algorithm utilizes dedicated hardware to implement its own mathematical functions. It would be advantageous to develop a system which enables reuse of hardware to maximize the operational efficiency. Operational efficiency includes, but is not limited to, time of processing, area of silicon to perform the processing, and the power required by the silicon during processing.

SUMMARY

According to the present invention, a mathematical engine is provided for performing multiple types of mathematical calculations, such that the hardware is utilized efficiently. The present invention includes a memory having a parallel output used to store one or more values which are selectively output in a parallel output of logically adjacent values. In the case that the length of the stored value, such as a vector, exceeds the capacity of the computational section, the memory is addressed so as to provide portions of the vector, referred to as a fold, in a logical sequence which permits completion of a mathematical execution on the full vector.

Different algorithmic results are generated by the selective use of enable signals which enable data transfer and proper mathematical calculations to effect control of the operation of the mathematical engine. This has the advantage of increasing the flexibility of the mathematical engine to perform different types of calculations, and also provides an economy of processor circuitry to reduce the amount of semiconductor real estate required when designing the signal processor.

DETAILED DESCRIPTION OF THE PREFERRED EMBODIMENT(S)

Figure 1:
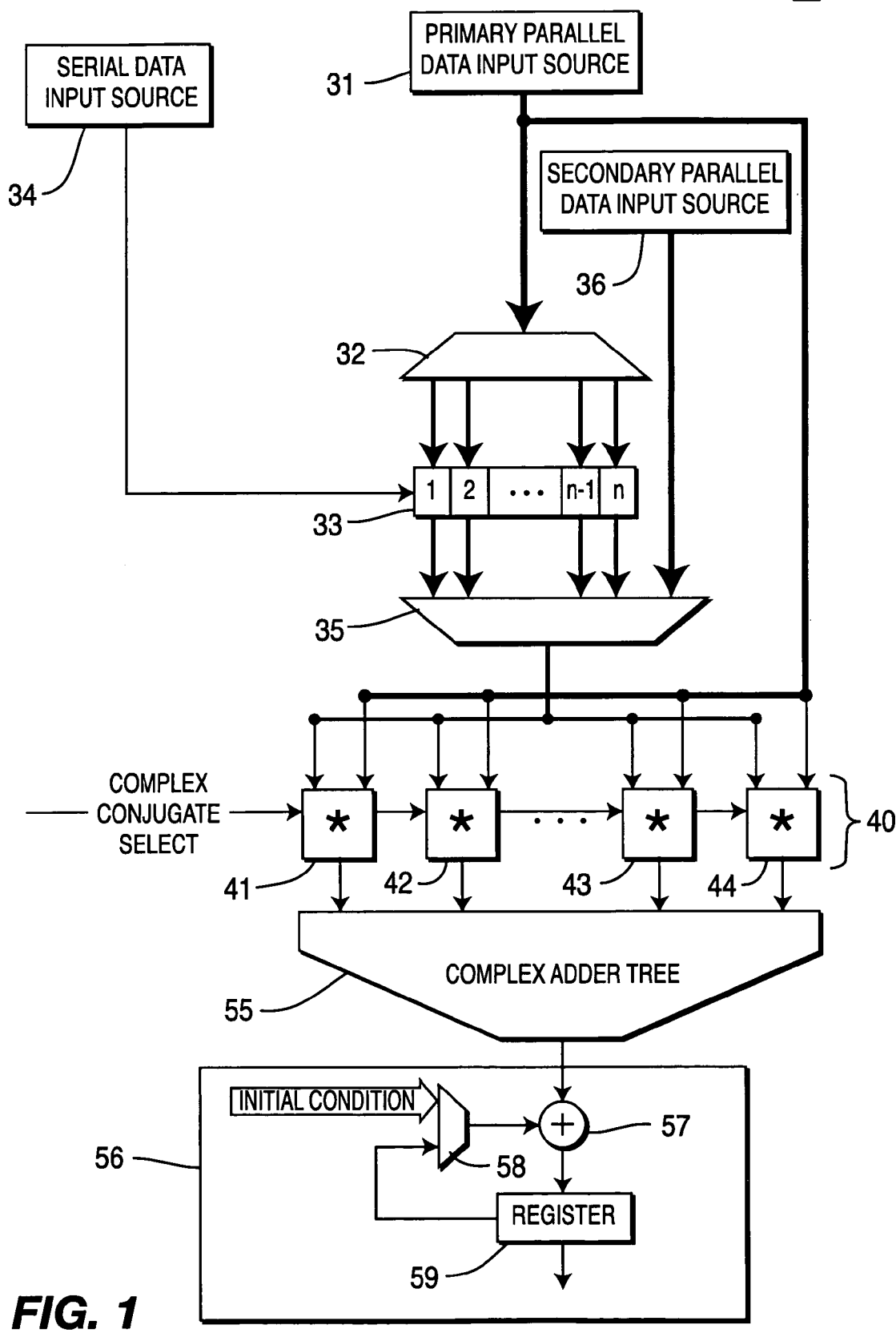
FIG. 1 is a general block diagram the mathematical engine of the present invention.

The present invention will be described with reference to the drawing figures wherein like numerals represent like elements throughout.

The present invention is a single mathematical engine for processing a plurality of separate and distinct algorithms. The mathematical engine is capable of utilizing the same hardware for all of the algorithms. Because multipliers require significant space on the ASIC, the present invention reduces the amount of required space for the ASIC. The mathematical engine of the present invention is also very efficient in performing required calculations by using the hardware a higher percentage of the time. The efficiency of the mathematical engine is dependant on the sizes of the input matrixes and the number of processing elements.

In general, the mathematical engine has at least two inputs and one output. The inputs include a serial input and a parallel input, where the parallel input is as wide as the number of processing elements. The number of processing elements may be optimized to be an entire vector, a piece of a vector, or a vector of a matrix. The parallel and serial inputs can both be loaded into a shift register, or another type of serial access register, for different types of operations. The parallel output shift register is a memory which has a parallel output and which permits rapid output of the data stored. The parallel output of the shift register is multiplexed such that logically adjacent values, whose width is determined by the number of processing elements, can perform the function of a serial access register, can perform the function of a parallel output shift register having a selectable output, or can provide access to a secondary parallel input. The primary parallel input and the multiplexed parallel output of the shift register and secondary parallel input act as inputs to complex multipliers and an adder tree, which increases the efficiency of the calculations performed by the mathematical engine. This permits data to be moved into the registers as quickly as possible for each of the performed operations, and also permits re-organization of the data for internal steps of the operation to be performed efficiently.

In the preferred embodiment, the parallel output shift register outputs data from logically adjacent data values, so that the output is used to store a value which is selectively output in parallel to a computational section. In the case of the length of the stored vector exceeding the capacity of the computational section, the parallel output shift register is addressed so as to provide portions of the vector in a sequence which permits completion of a mathematical execution on the full vector. As a result, almost every clock results in a calculation, instead of multiple steps to prepare the data for the operation. When coupled with an output circuit of a given length, the parallel output shift register is a parallel output n-fold shift register, meaning that its memory store is n times the data width of the computational section (i.e. the number of the processing elements).

The adder tree feeds an accumulator, which enables many different matrix-to-matrix and matrix-to-vector multiplications and enables efficient calculations such as $A^H A$ and $A^H r$.

According to the present invention, the dot product calculations performed by the mathematical engine include, but are not limited to, a plurality of different types of multiplications required for channel estimation and data estimation such as: the prime factor FFT; the multiplication of a matrix by another matrix, multiplication of a matrix by its complex conjugate transpose, and a multiplication of a matrix by a vector.

Referring to FIG. 1, a block schematic diagram of a mathematical engine 30 made in accordance with the present invention is shown. The mathematical engine 30 includes an Primary Parallel Data Input Source (PPDIS) 31, a demultiplexer 32, an n-fold shift register 33, a Serial Data Input Source (SDIS) 34, a multiplexer 35 and a Secondary Parallel Data Input Source (SPDIS) 36. Also included is a complex multiplier processing element (PE) array 40, consisting of a plurality of array elements (41-44 shown), a complex adder tree 55 and an complex accumulator 56. The complex accumulator 56 includes an initial condition input multiplexer 58, a summer 57, and a summer output register 59. The summer output register 59 provides an accumulated output. The PE array 40 provides parallel complex multiplication functions, including dot product outputs.

In operation, the output of the PPDIS 31 contains Q locations. The SDIS 34 provides the shift register 33 with a complex received chip sequence. This output from the SDIS 34 is used to serially load the shift register 33. The shift register 33 has n-folds, where each fold has Q locations with each location containing a complex value. Additionally it can load any fold with values from the Q locations from the PPDIS 31, or shift in X locations of zeros every clock. The multiplexer 35 receives an output from the shift register 33 and a complex Q location value from SPDIS 36.

The output from the multiplexer 35 is provided to the complex multiplier array 40 which is used to provide corresponding inputs to the complex adder tree 55. The complex adder tree 55 is a Q input complex adder tree.

The adder tree 55 provides its output to the accumulator 56. The accumulator 56 is provided with an initial condition at the summer 57, which is supplied through multiplexer 58. The result of the output of summer 57 is stored in the output register 59.

The mathematical engine 30 of the present invention shown in FIG. 1 is able to perform several different types of calculations, thereby obviating the need for separate processors and, as a result greatly reducing the amount of ASIC real estate required for such mathematical calculations. Three different applications of the preferred embodiment in a WTDD communication system are described hereinafter, but are not limited to: 1) generation of the Autocorrelation Matrix ($A^H A$); 2) Whitened Matched Filtering ($A^H r$); and 3) Channel Estimation implemented via the Steiner Algorithm. However, it would be understood by those of skill in the art that other algorithms may be implemented without departing from the spirit and scope of the present invention.

An example of the present invention implementing the $A^H A$ function will be described with reference to FIGS. 2A-2C and FIGS. 3A-3G. This example will describe the process of implementing $A^H A$ function utilizing the mathematical engine of FIG. 1 in accordance with the present invention. The $A^H A$ function is one of the most complex functions calculated with a mathematical engine because it is calculated from a partially stored matrix and the same partially stored matrix accessed in a different manner with an only a partially calculated result. The order of the operations is not based on a logical progression of matrixes, but rather how the matrixes fit through the existing functions of the mathematical engine.

Figure 2A:
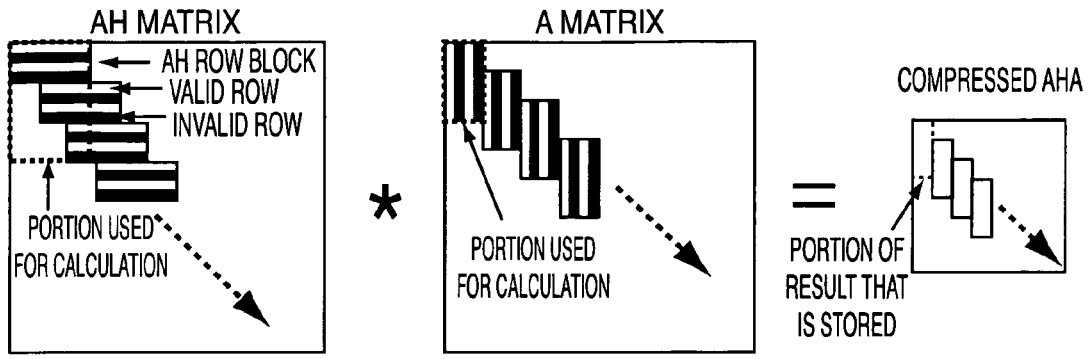
FIGS. 2A-2C show multiplication of the System Response Matrix ($A^H$) with its complex conjugate transpose (A) to calculate the Autocorrelation Matrix ($A^H A$).

FIG. 2A is a simple field matrix representation of the $A^H$, A and $A^H A$ matrixes. Only the $A^H$ row block is stored in memory, so the entire $A^H$ and A matrixes are represented as addressing functions on the stored row block with the ability to access the data with the imaginary portion of the data inverted to use the data as in the A matrix. The resulting $A^H A$ matrix is stored compressed, as if it was constructed from the $A^H$ and A matrixes.

Figure 3A:
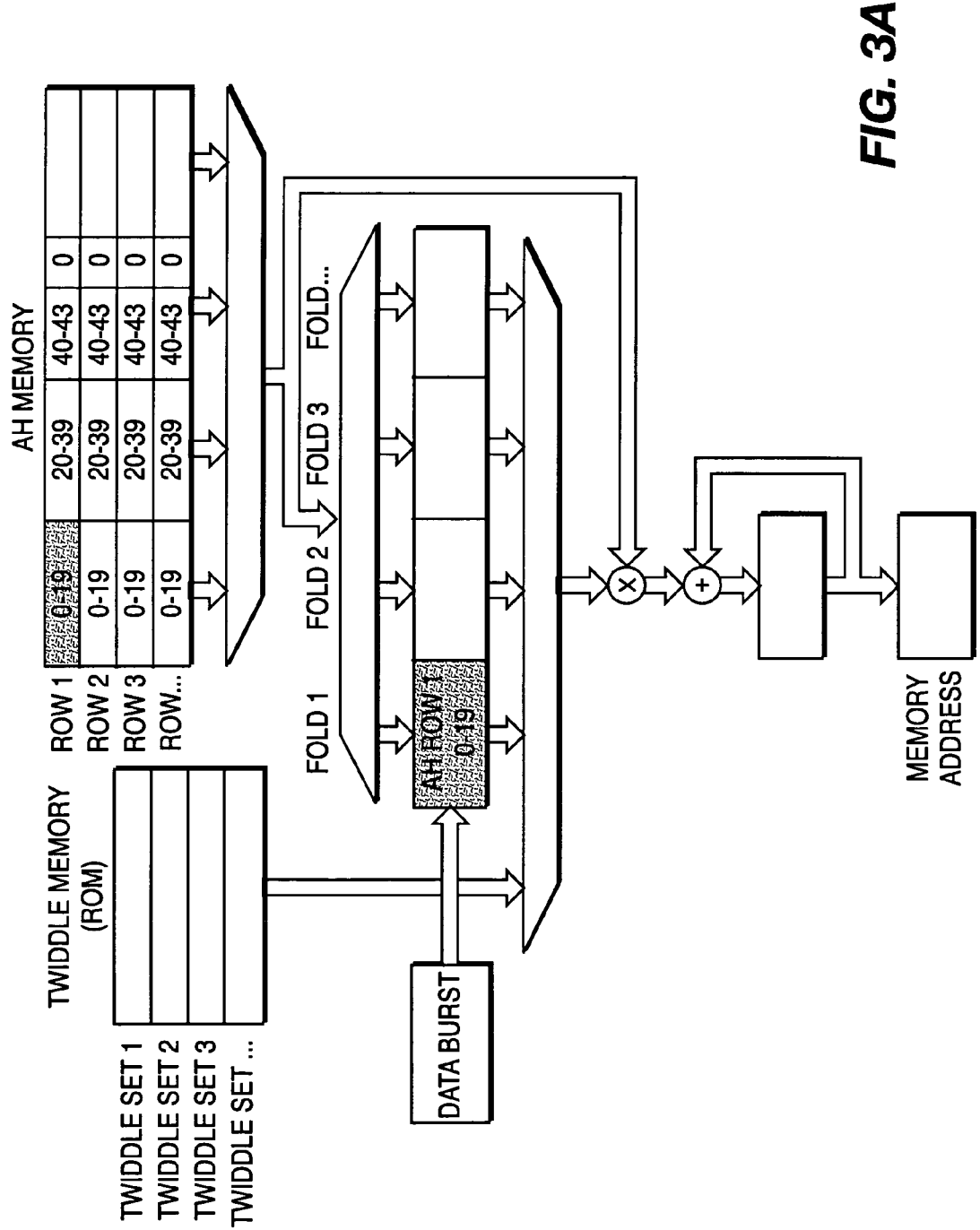
FIGS. 3A-3G show the mathematical engine of FIG. 1 performing the calculations required for the $A^H A$ function.
Figure 3B:
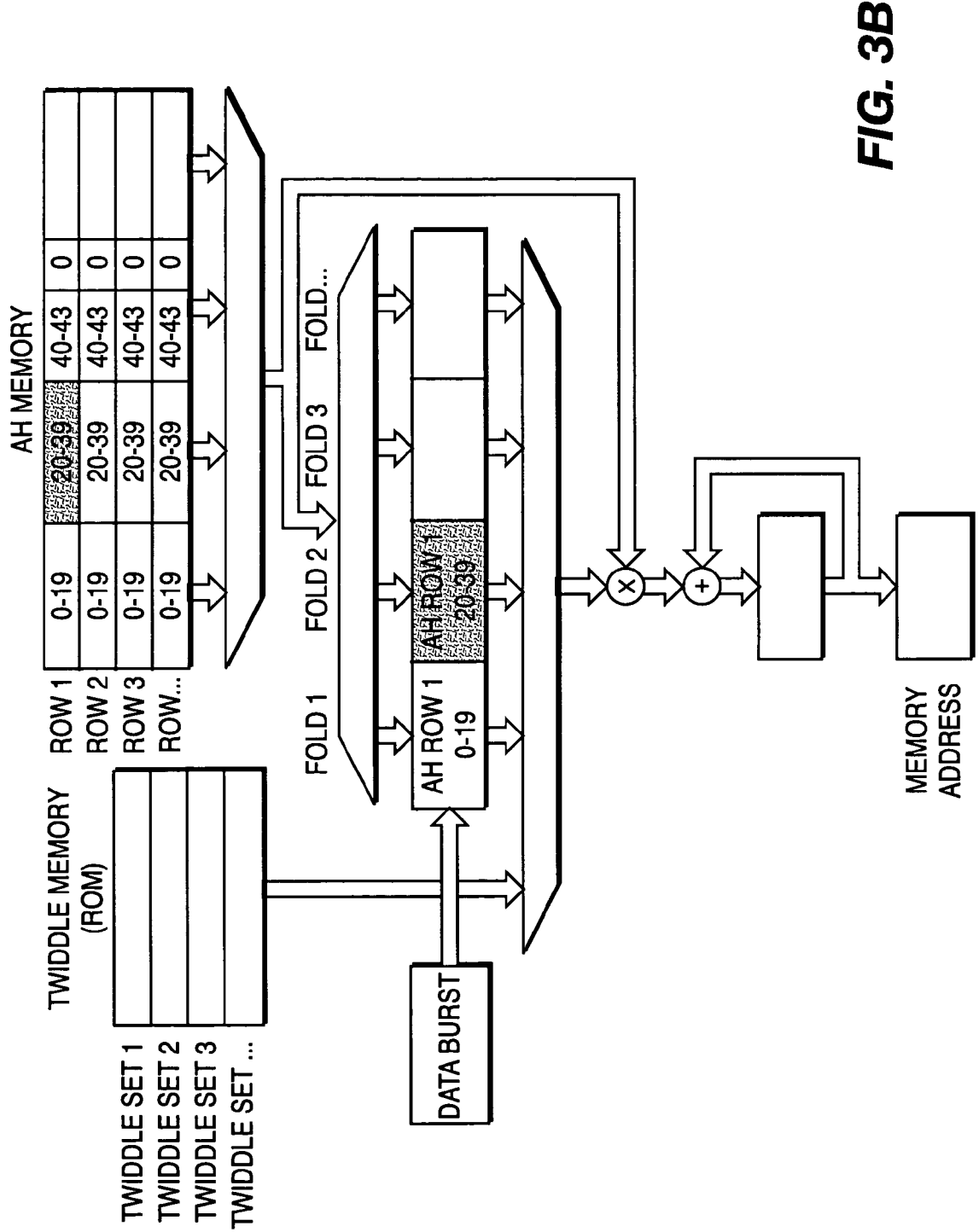
Figure 3C:
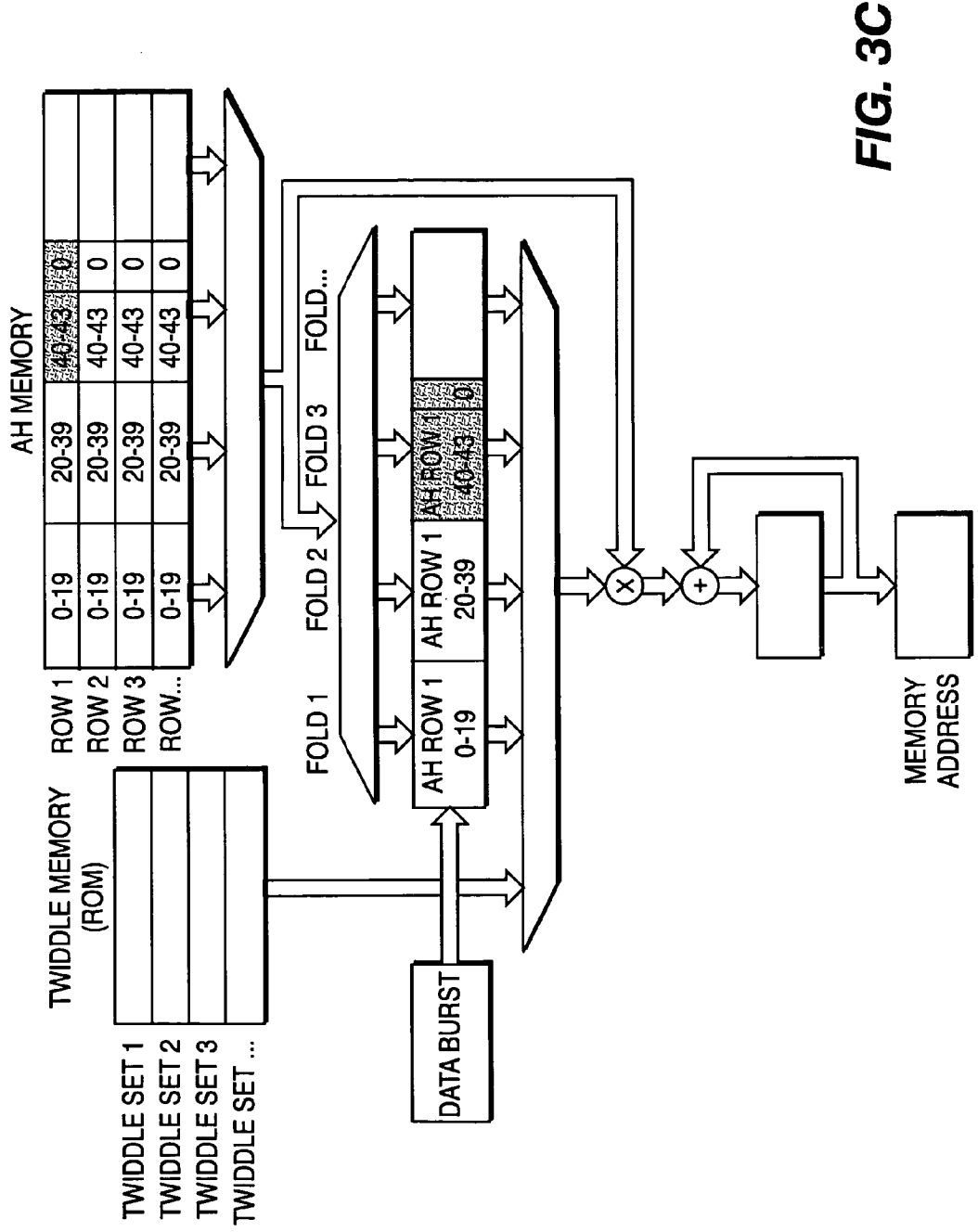

Since the $A^H$ sub block is only stored in one single access memory, (the PPDIS 32, in FIG. 1), the first step is to copy the contents of the $A^H$ Memory into the shift register 33 where it can also be manipulated to represent the second and third row blocks as they are seen only by the window of data used in the calculations. Since the $A^H$ matrix is Spreading Factor (SF)+ Channel Response Length (W)-1 values wide, and there are only 20 processing elements, each $A^H$ word is 20 values. Data is moved in 20 value chunks called folds, (in this case for example SF+W-1=44, so there are 3 folds). FIGS. 3A, 3B and 3C show the first three clock cycles which demonstrate the loading of the first $A^H$ row into the shift register.

In FIG. 3A the first fold of the first row of the $A^H$ block is loaded into the first fold storage in the shift register. In FIG. 3B the second fold of the first row of the $A^H$ row block is loaded into the second fold storage in the shift register. In FIG. 3C, the third fold of the first row of the $A^H$ row block is loaded into the third fold storage in the shift register.

Figure 2B:
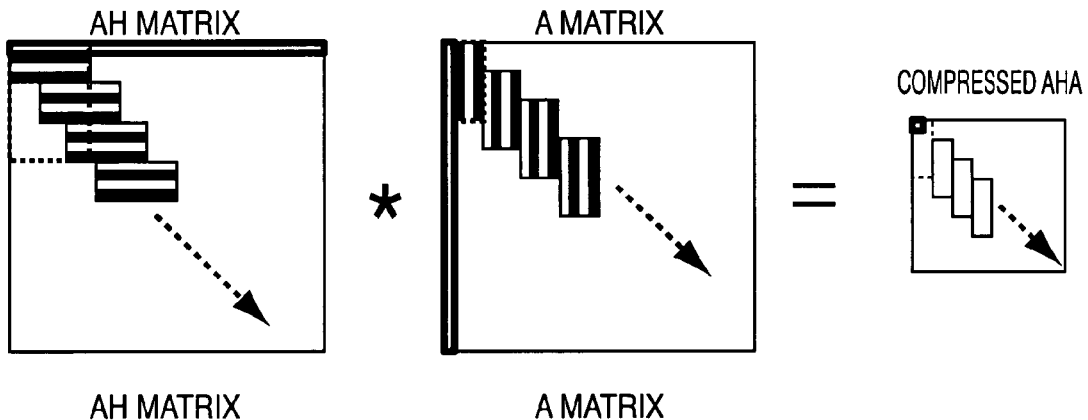

The portions of the matrix that will be computed are highlighted in FIG. 2B. The entire rows are highlighted, but only the portions of the matrixes that are inside the doted lines are used in the calculations. FIG. 2B shows the first row of the $A^H$ matrix times the first column of the A matrix resulting in the first value of the $A^H A$ matrix.

Since the $A^H$ and A matrix row and column blocks are larger than the number of processing elements, (in this example a row and column size of 44), the calculation is done one fold at a time, (or 3 folds done over 3 clocks). Each of the fold segments are multiplied and accumulated in the accumulation register 59, (shown in FIG. 1) until the entire row is done, at which time the result is stored external to the mathematical engine. The $A^H$ matrix is represented by the values in the shift register while the A matrix values are represented in the $A^H$ memory with an inverse function on the imaginary values, which is performed, by taking their conjugate in the complex multiplier array 40 (,shown in FIG. 1).

Figure 3D:
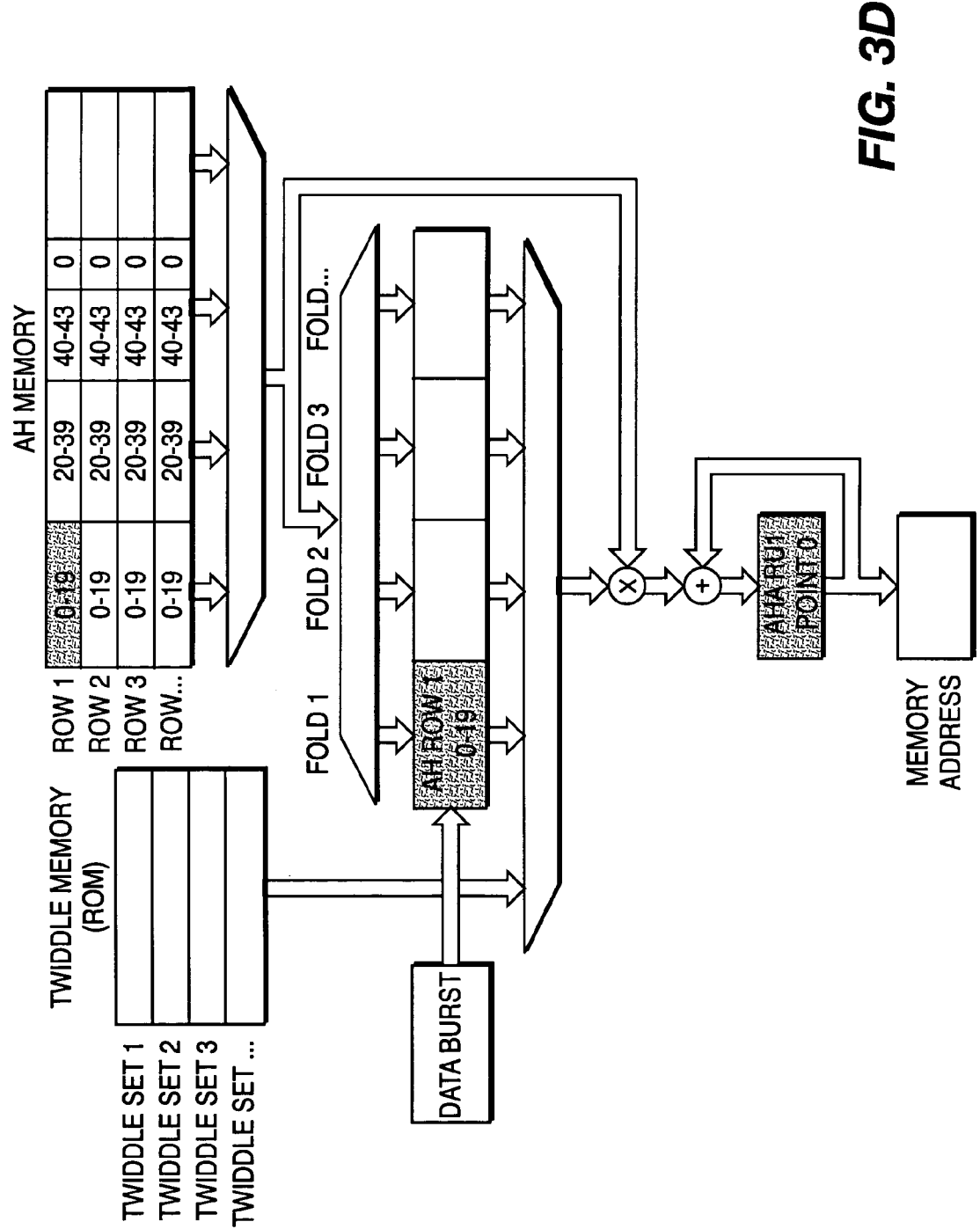
Figure 3E:
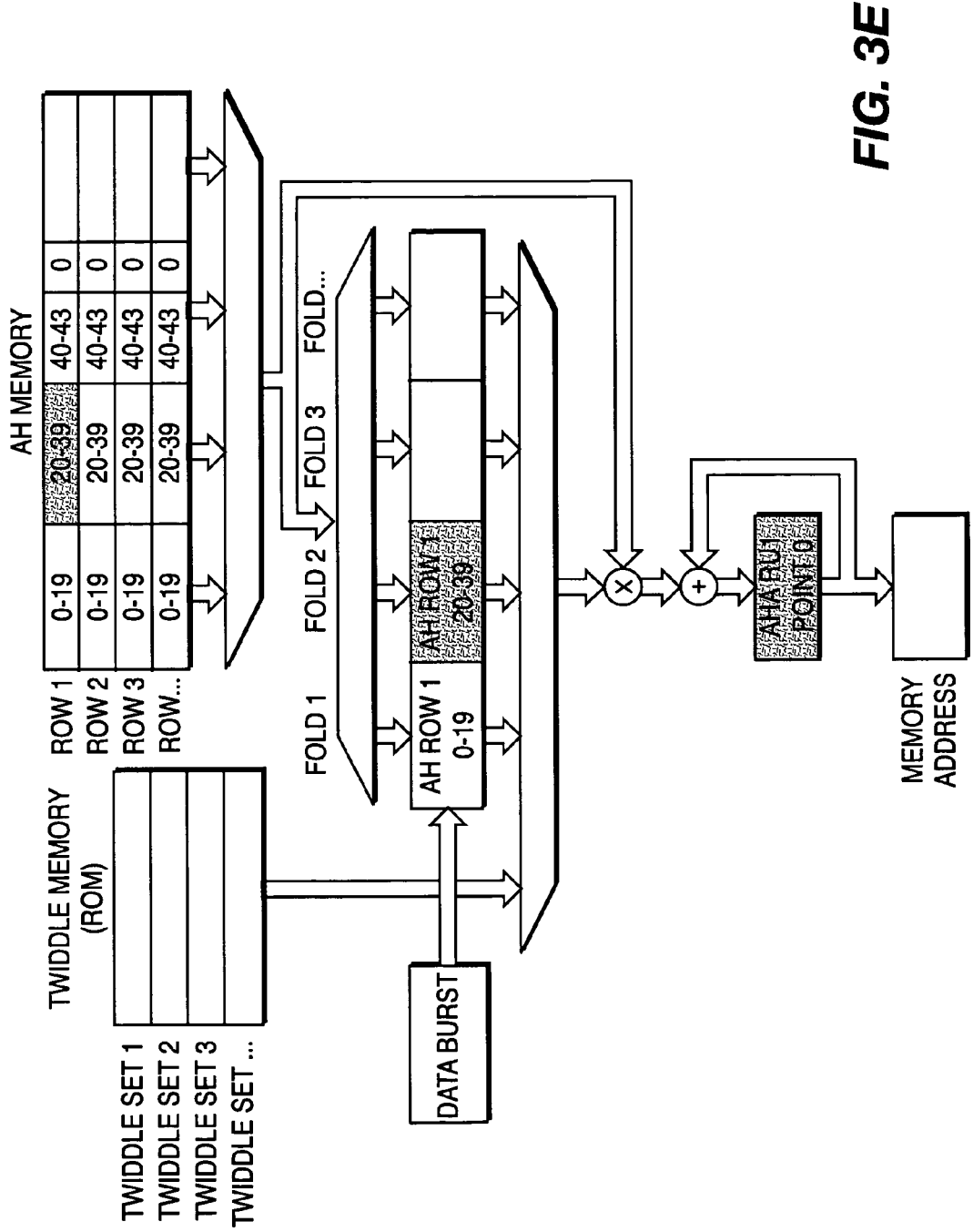
Figure 3F:
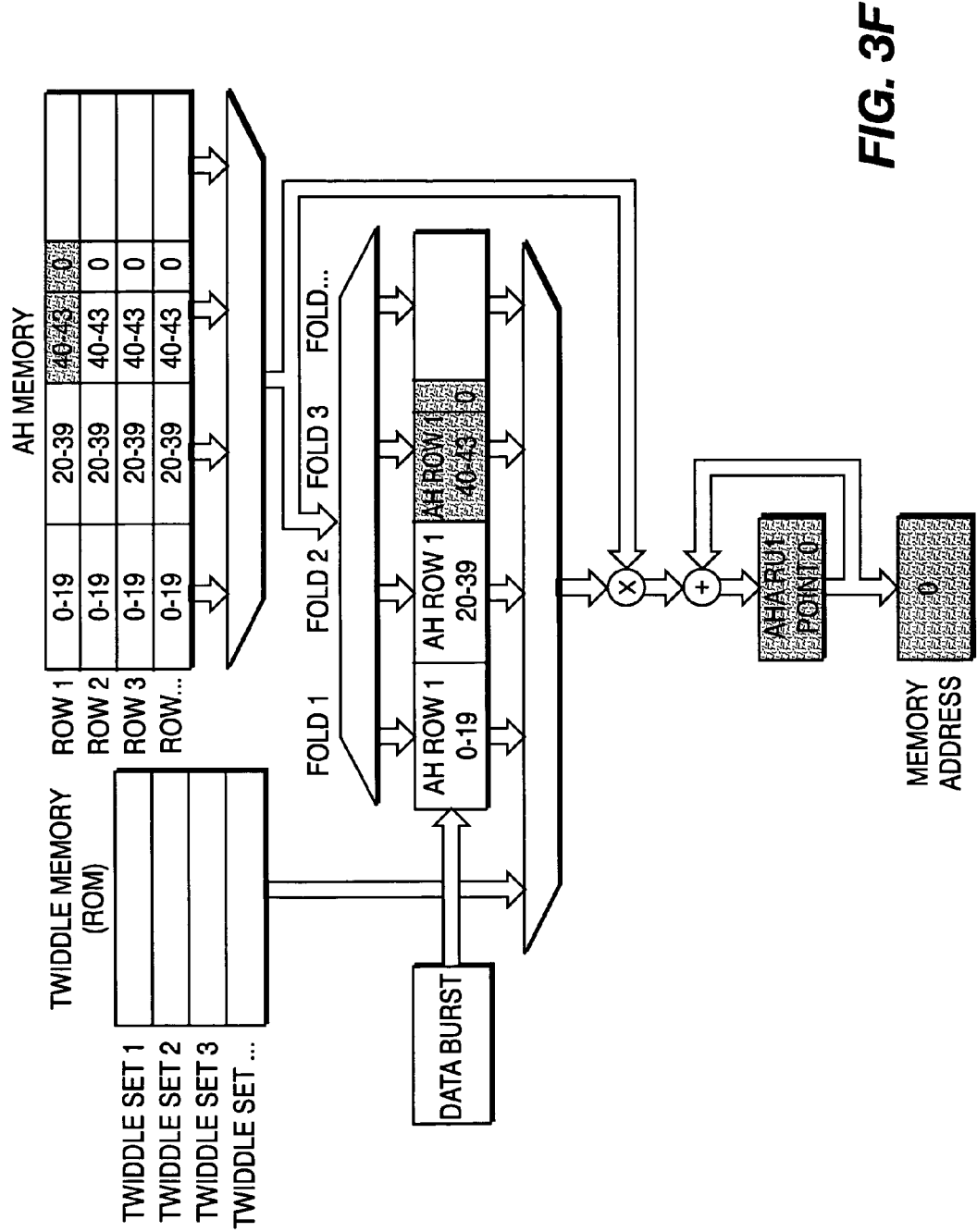
Figure 3G:
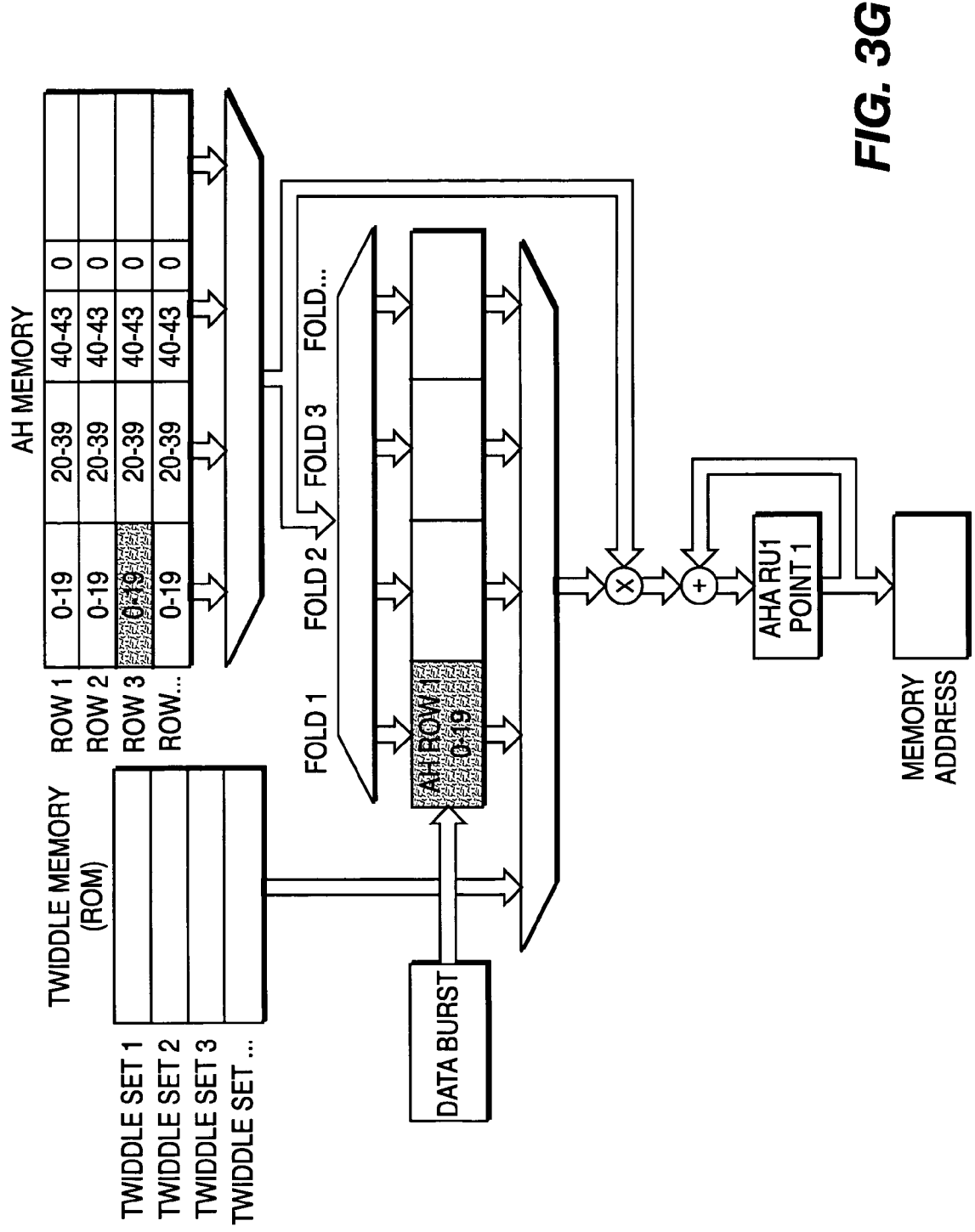

FIG. 3D shows the multiplication of the first fold of the first row of the $A^H$ matrix with that of the first fold of the first column of the A matrix. The result of this multiplication is stored in the accumulation register 59. FIG. 3E shows the multiplication of the second fold of the first row of the $A^H$ matrix with that of the second fold of the first column of the A matrix. The accumulated result of this multiplication is added to the previous accumulated value and is stored in the accumulation register 59. FIG. 3F shows the multiplication of the third fold of the first row of the $A^H$ matrix with that of the third fold of the first column of the A matrix. The accumulated result of this multiplication is added to the previous accumulated value and is stored in the accumulation register 59. The value stored in the accumulation register 59 represents the first location of the $A^H A$ matrix and is stored externally for further processing. This multiplication takes 3 clocks, one for each fold, but only the first clock is represented in FIG. 3G, which shows the multiplication of the first fold of the first row of the $A^H$ matrix with that of the first fold of the second valid column of the A matrix. The result of this multiplication is stored in the accumulation register 59. This process proceeds for 3 clocks until the accumulated result is stored externally for further processing.

Figure 2C:
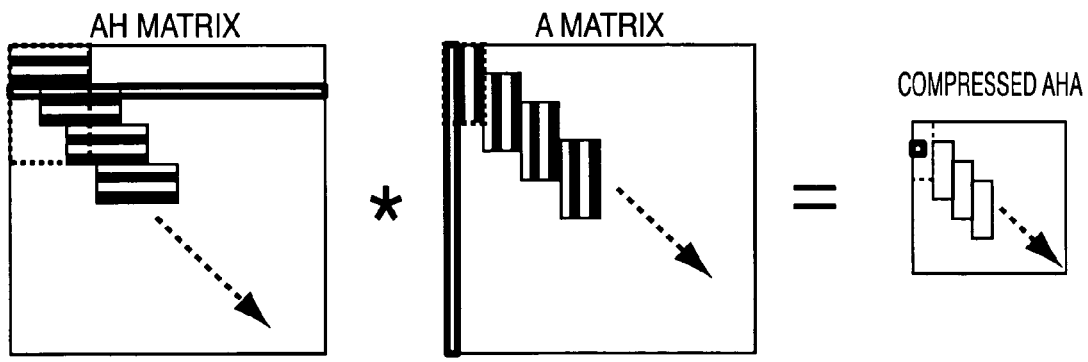

In FIG. 2C it can be seen how 16 zeros have been shifted into the left of the shift register 33 so that the second row block of the $A^H$ matrix is seen through the window of inputs used for the calculation window. This process takes only one clock and can be done in parallel with the rest of the calculations, thereby significantly saving time. This shifted version of the first row of the $A^H$ matrix sub block has to be multiplied by all valid columns of the A matrix sub block for each shifted version of the $A^H$ sub block in the values used in calculation window.

After every fold of the first valid $A^H$ row is multiplied by every valid column of the A matrix sub block contained in the window of inputs used for calculation, the entire same process is done for every other valid row. The out of order process is done so the $A^H$ rows do not have to be re-loaded for the shifted versions of the $A^H$ sub blocks.

As a second example, the $A^H r$ function as performed by the mathematical engine of FIG. 1 will be described with reference to FIG. 4A-4D and FIGS. 5A-5I. The $A^H r$ function is the multiplication of the entire $A^H$ matrix with the received vector (r). The $A^H$ matrix is not entirely stored, only a smaller portion called the $A^H$ row block is actually stored; all the other values in the $A^H$ matrix are actually repeated $A^H$ row block, or zeros. Accordingly, $A^H$ can be stored as a complex addressing scheme of the $A^H$ row block.

For example, there are a total of 61 $A^H$ row blocks in a Wide Band TDD Third Generation (3G) data burst type 1 or 3, and 69 $A^H$ row blocks in a burst type 2 timeslot. There are actually two r vectors, one for data field one and another for data field two. For simplicity, this function will be described for one r vector; this process is then repeated for the second data set vector.

Figure 4A:
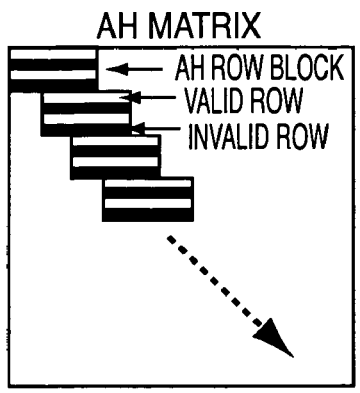
FIGS. 4A-4D show multiplication of the $A^H$ matrix with the received signal vector (r).
Figure 4A:
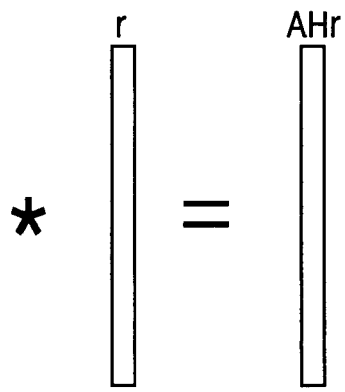

FIG. 4A is a diagram representing the $A^H r$ matrix multiplication. The $A^H$ row block is repeated throughout the $A^H$ matrix with all the rest zeros. Of the rows of the $A^H$ row block, two of the four rows have been invalidated by prior processing.

The first step in calculating $A^H r$ function is to preload the entire shift register 33 of the mathematical engine with the r vector values. The shift register 33, (shown in FIG. 1), is loaded serially by the SDIS 34. The $A^H$ matrix is provided at the PPDIS 31.

Figure 4B:
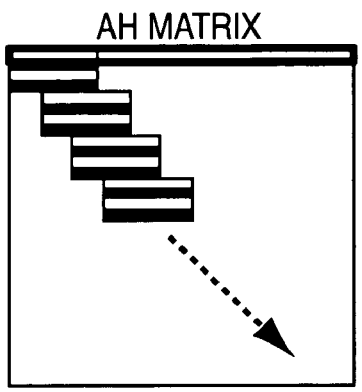
Figure 4B:
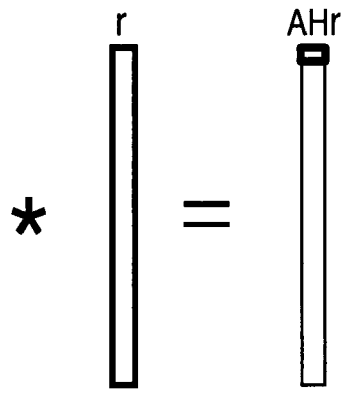

To start the step-by-step process of calculating $A^H r$, the calculation of the first row of the $A^H$ matrix with the r vector is shown in FIG. 4B. Because only the first SF+W−1 values of the $A^H$ vector contain values other than 0, only the first portion of the row product is calculated. Since there are only 20 processing elements, multiplication has to be done in multiple steps (e.g. the folds) in this example the W is 29, so SF+W−1 is 44). Dividing SF+W−1 by the number of processing elements (20) and rounding up there are a total of 3 folds, or three clocks of multiply and accumulate to calculate the entire dot product of the valid portion of the $A^H$ row with the valid portion of the r vector. These first three clocks shown in FIGS. 5A, 5B and 5C show the step-by-step process of calculating this first value of the dot product of this matrix row and vector.

Figure 5A:
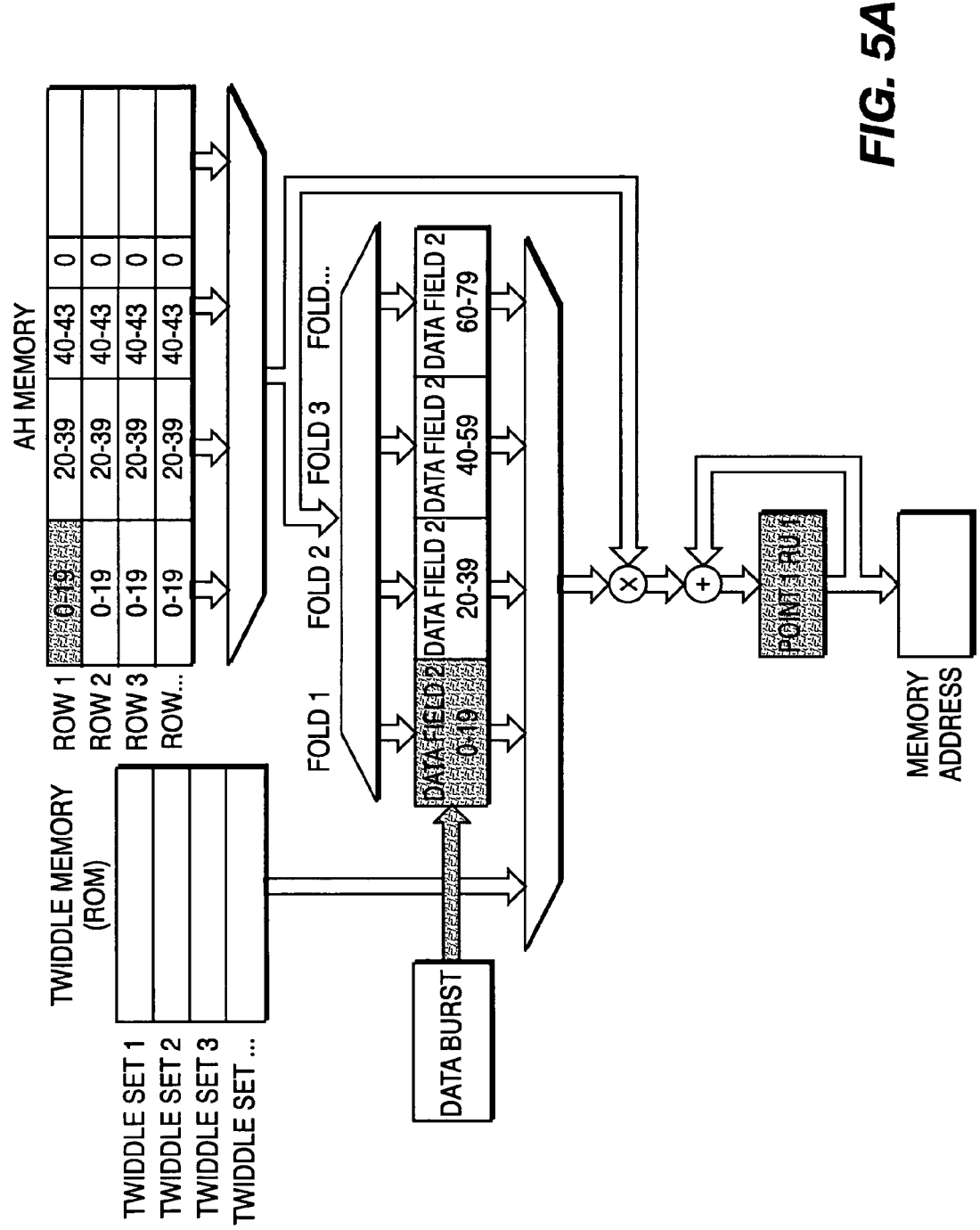
FIGS. 5A-5I show the mathematical engine of FIG. 1 performing the calculations required for the $A^H r$ function.
Figure 5B:
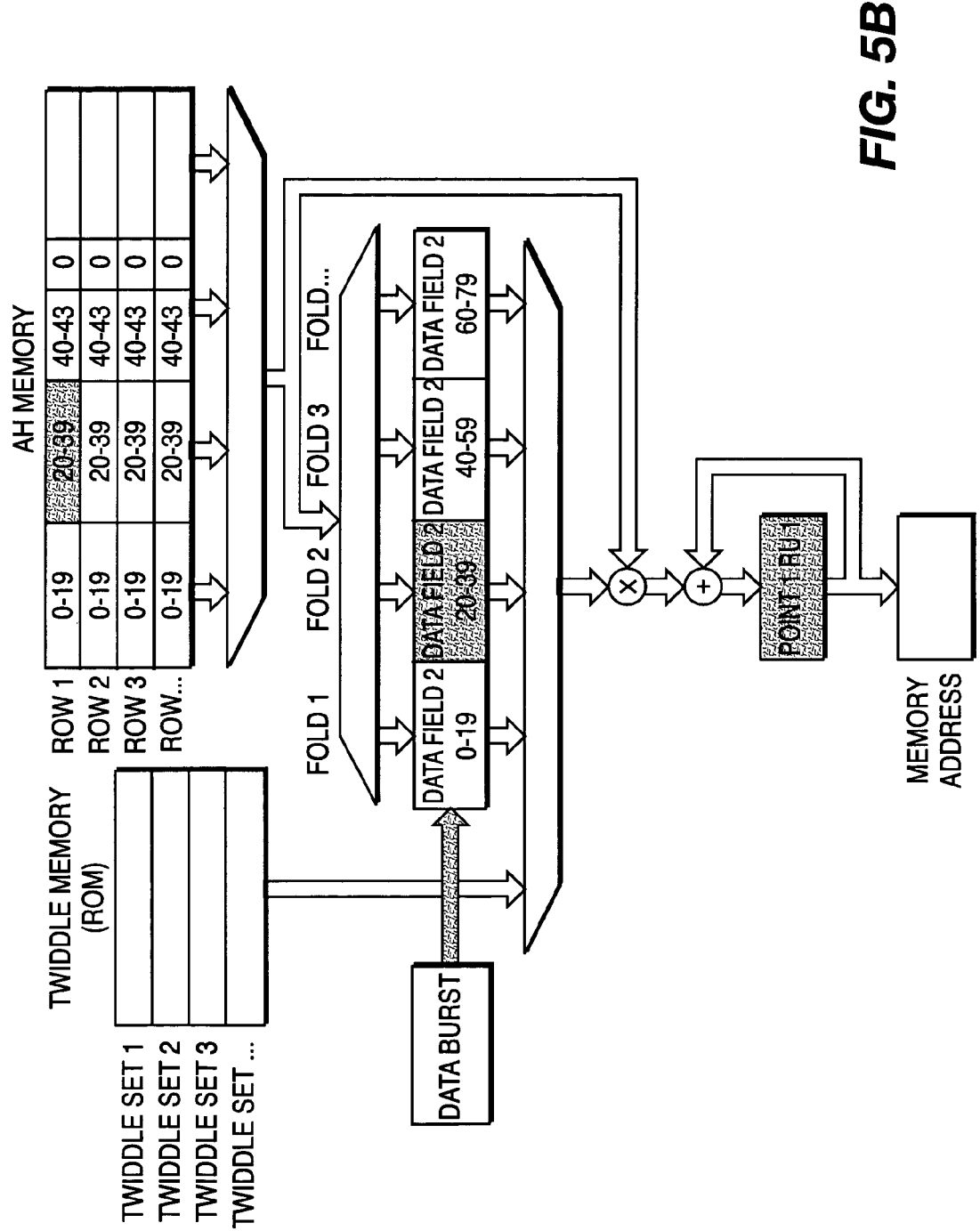
Figure 5C:
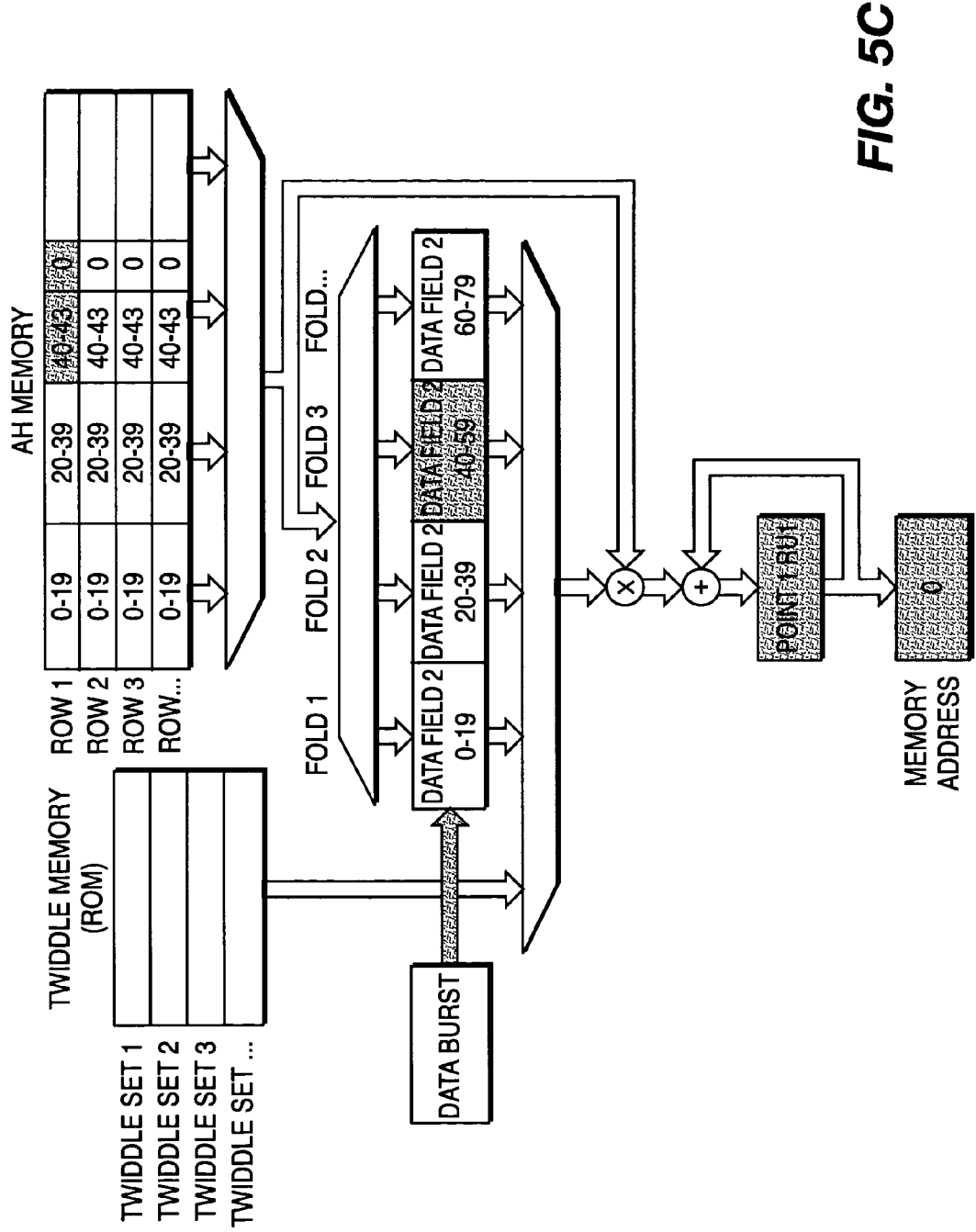

FIG. 5A shows the first fold of the first $A^H$ row being multiplied by the first fold of the r vector and the result being stored into the accumulation register 59. FIG. 5B shows the second fold of the first $A^H$ row being multiplied by the second fold of the r vector and the result being added to the result currently in the accumulator register 59. FIG. 5C shows the third fold of the first $A^H$ row being multiplied by the third fold of the r vector and the result being added to the result currently in the accumulator register 59. The resulting accumulation is now stored as the first $A^H r$ calculation point.

Figure 4C:
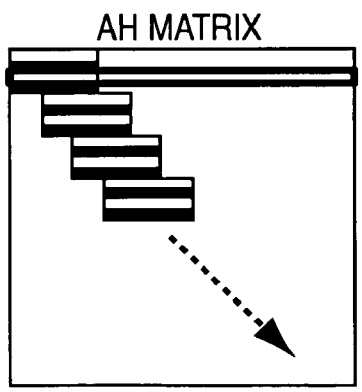
Figure 4C:
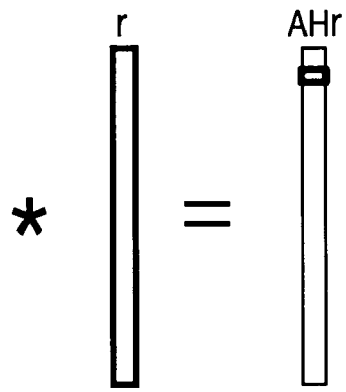
Figure 5D:
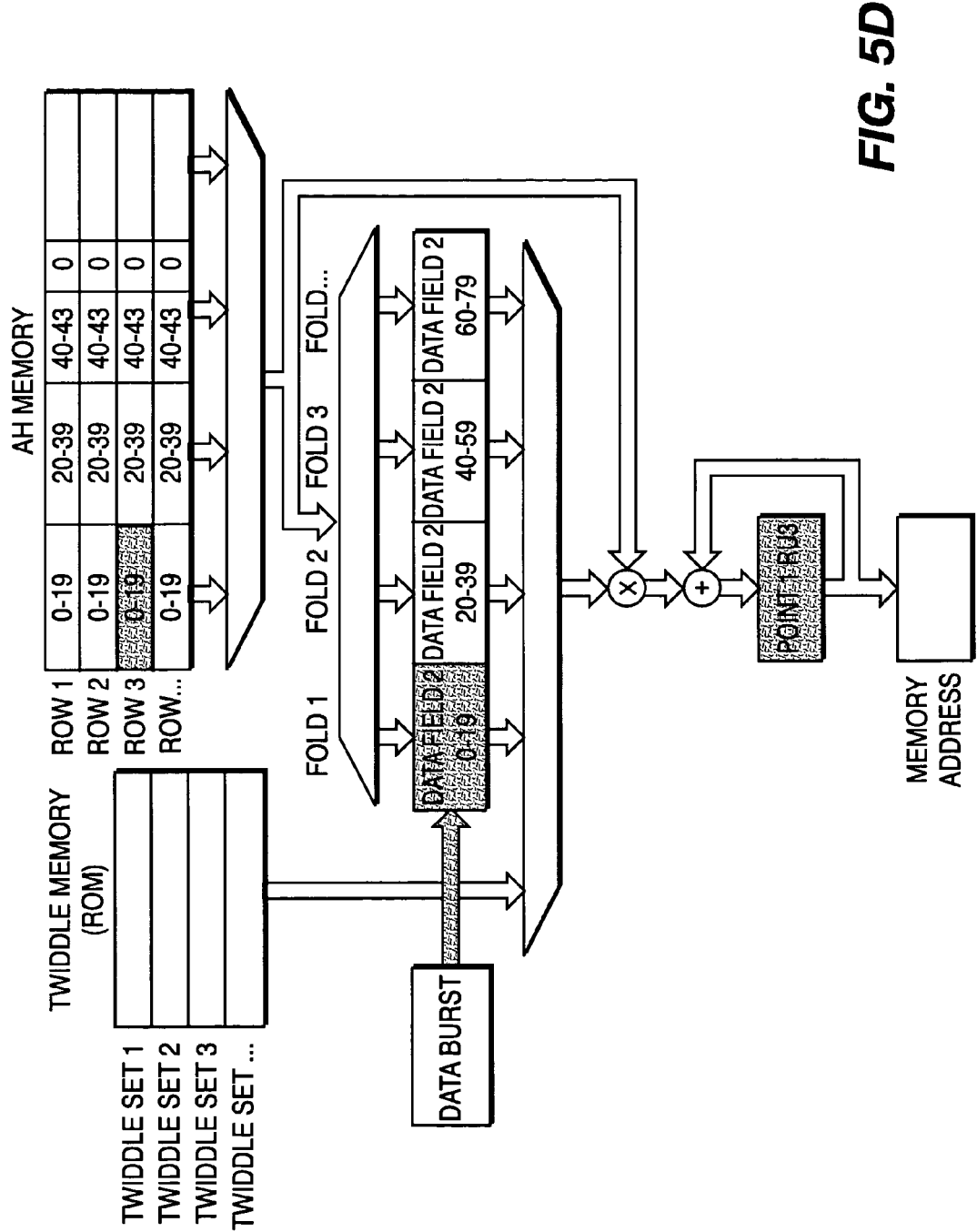
Figure 5E:
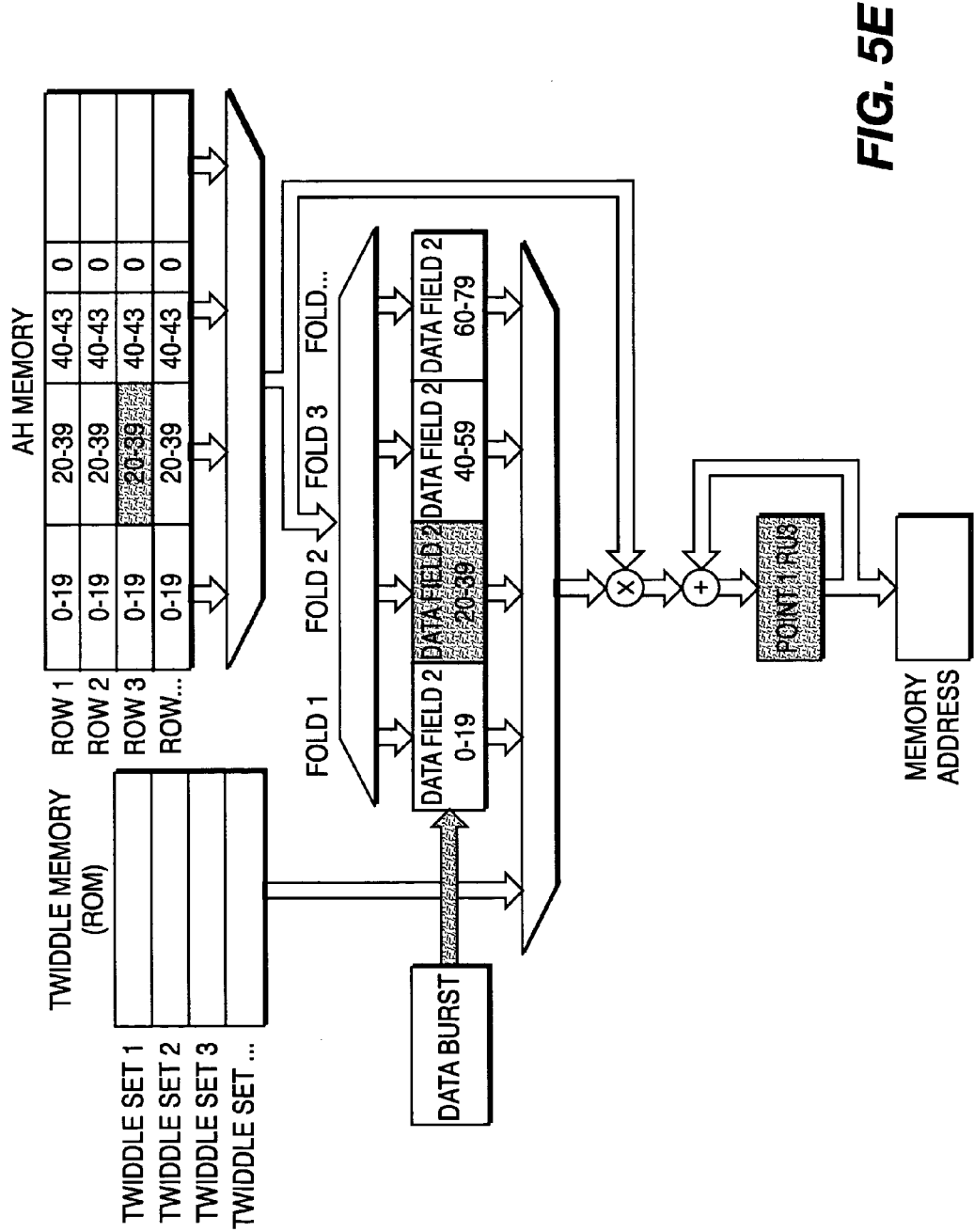
Figure 5F:
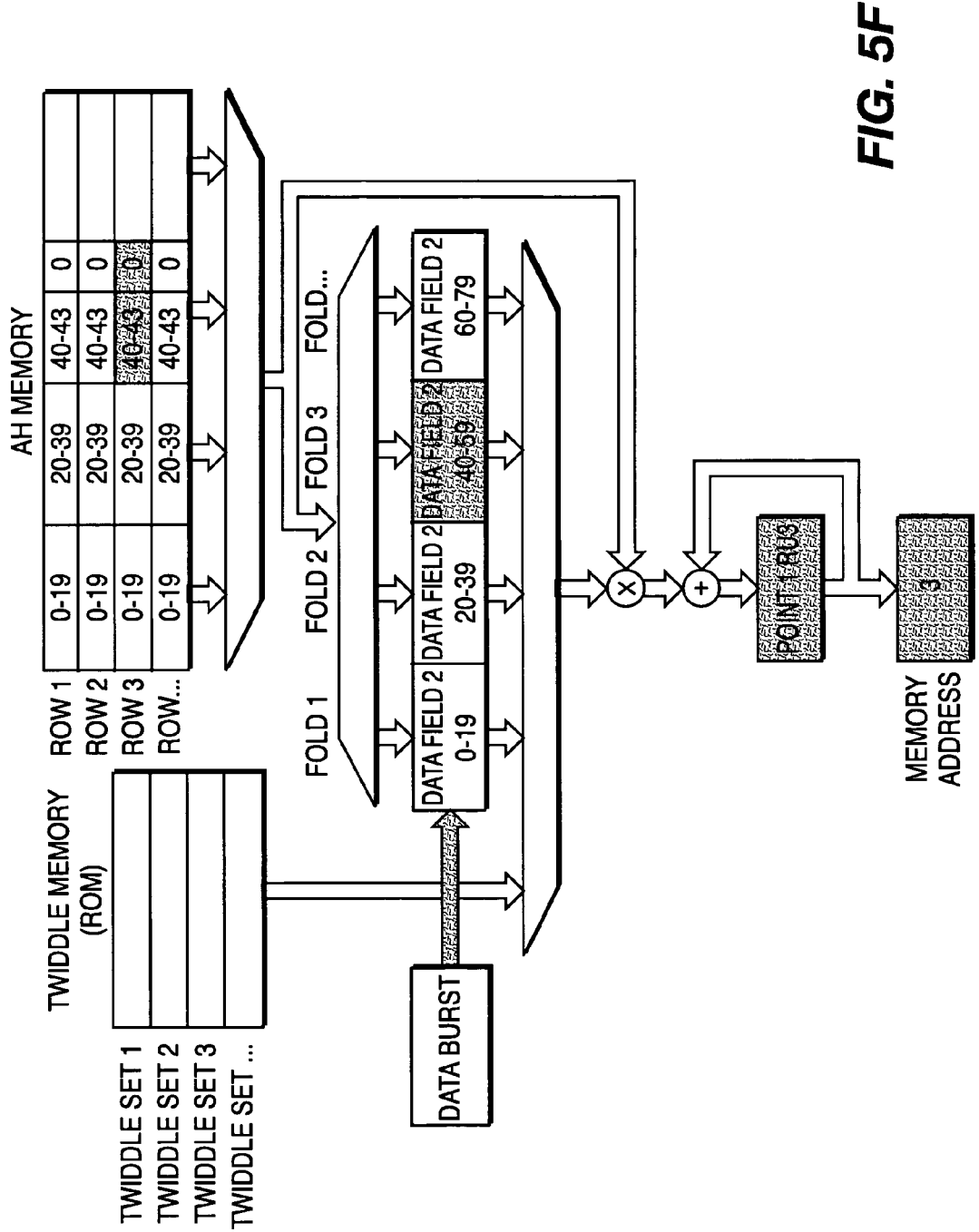

The next step is to calculate the next valid row of the $A^H$ row block with the currently calculated symbol. This involves the same portion of the r vector being multiplied by a new $A^H$ row as shown in FIG. 4C. The r vector can remain the same but a different row of $A^H$ is accessed in the $A^H$ memory. Again three clocks are shown in FIGS. 5D, 5E and 5F showing the multiplication accumulation of all three folds. FIG. 5D shows the first fold of the third $A^H$ row being multiplied by the first fold of the r vector and the result being stored into the accumulation register 59. FIG. 5E shows the second fold of the third $A^H$ row being multiplied by the second fold of the r vector and the result being added to the result currently in the accumulator register 59. FIG. 5F shows the third fold of the third $A^H$ row being multiplied by the third fold the r vector and the result being added to the result currently in the accumulator register 59. The resulting accumulation is now stored as the second $A^H r$ calculation point.

Figure 4D:
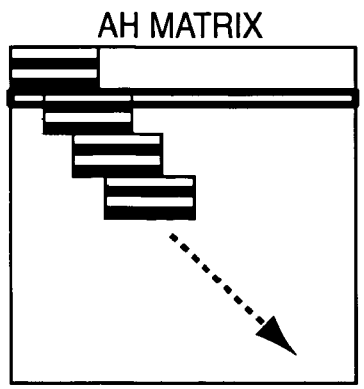
Figure 4D:
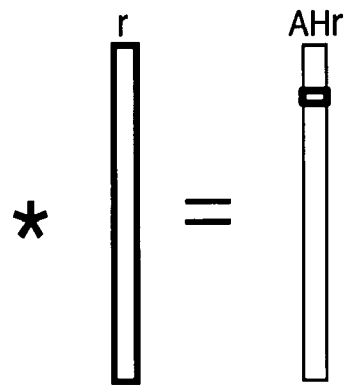

The next step is to start the calculations of the second $A^H$ row block with the r vector. This involves multiplying each of the valid $A^H$ second row sub block rows with the r vector. The portion of the r vector that is multiplied by the $A^H$ sub block is different, since the next row is shifted in 16 values from the last. In FIG. 4D the portions involved in the calculation are highlighted.

Figure 5G:
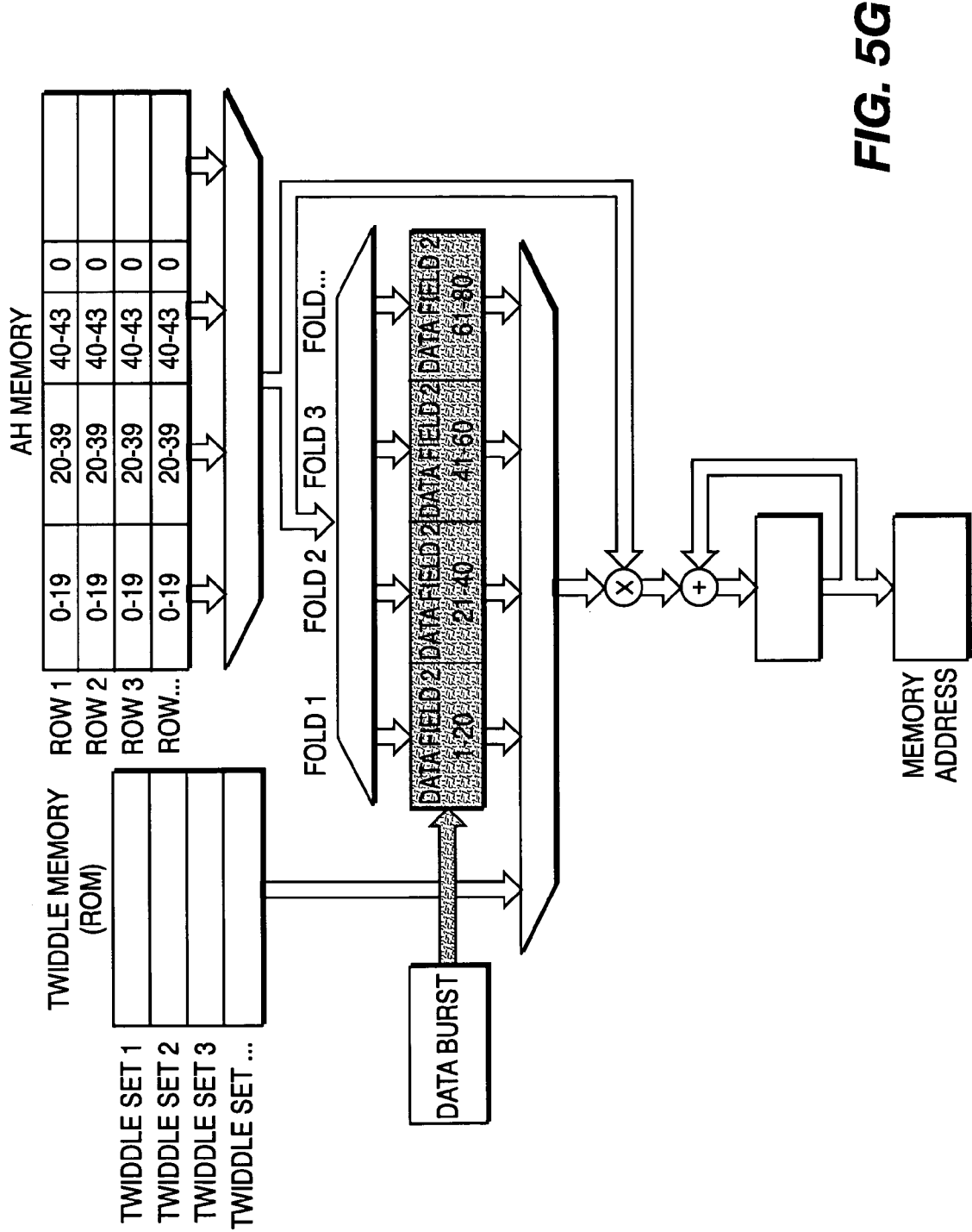
Figure 5H:
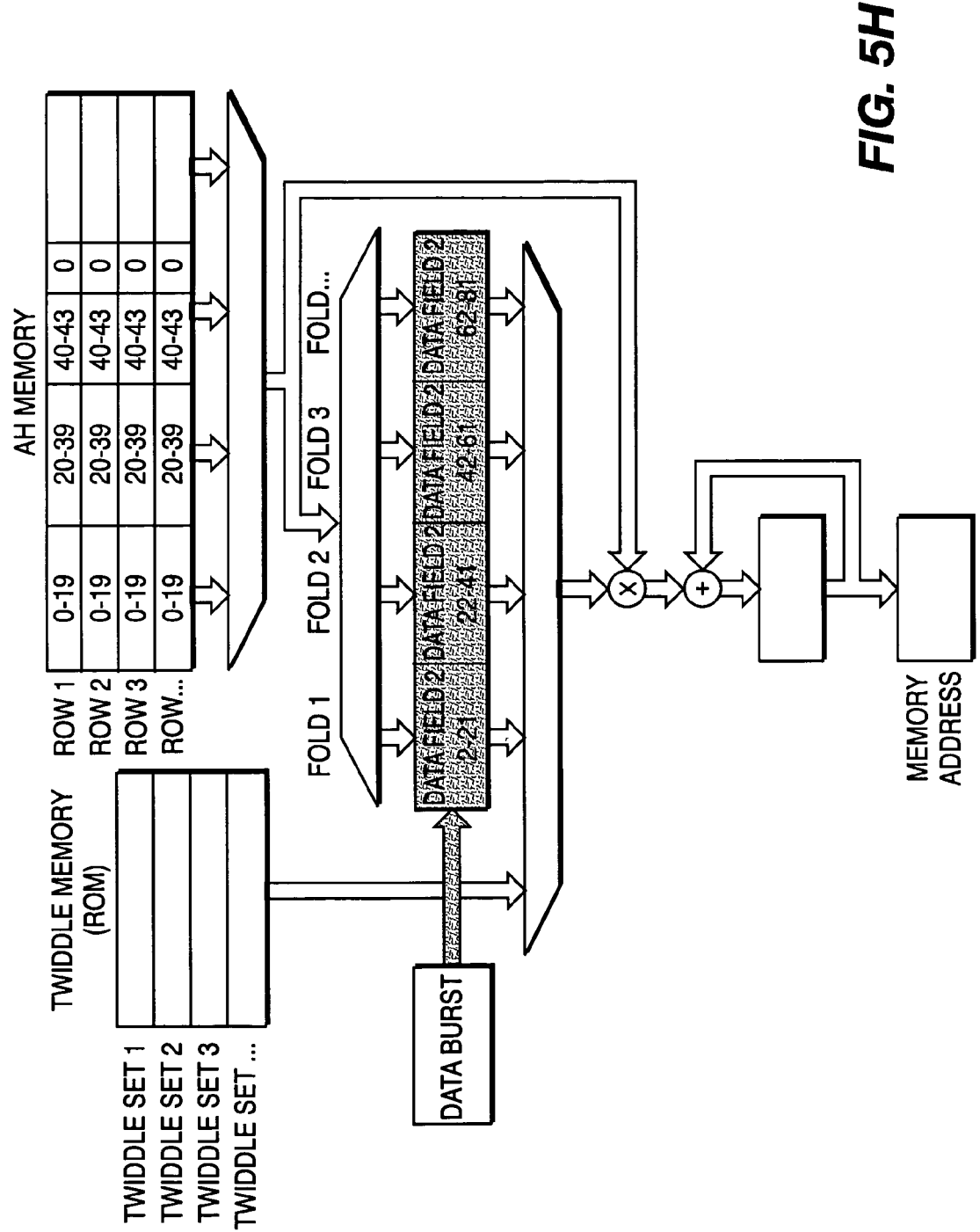

Since the $A^H$ row block stored is not moving, the r vector has to be shifted to re-align the portion of the r vector that is multiplied by the row in the new $A^H$ row block. This is done by using the shift register 33, shifting in 16 new values over 16 clocks, and dropping off the first values of the r vector. The first two clocks of this process are shown in FIGS. 5G and 5H, the rest are inferred. After that, the same process as used for the first $A^H$ row block is started, so the first clock of this repeated operation is shown to be compared with the first clock of the first $A^H$ row block.

Figure 5I:
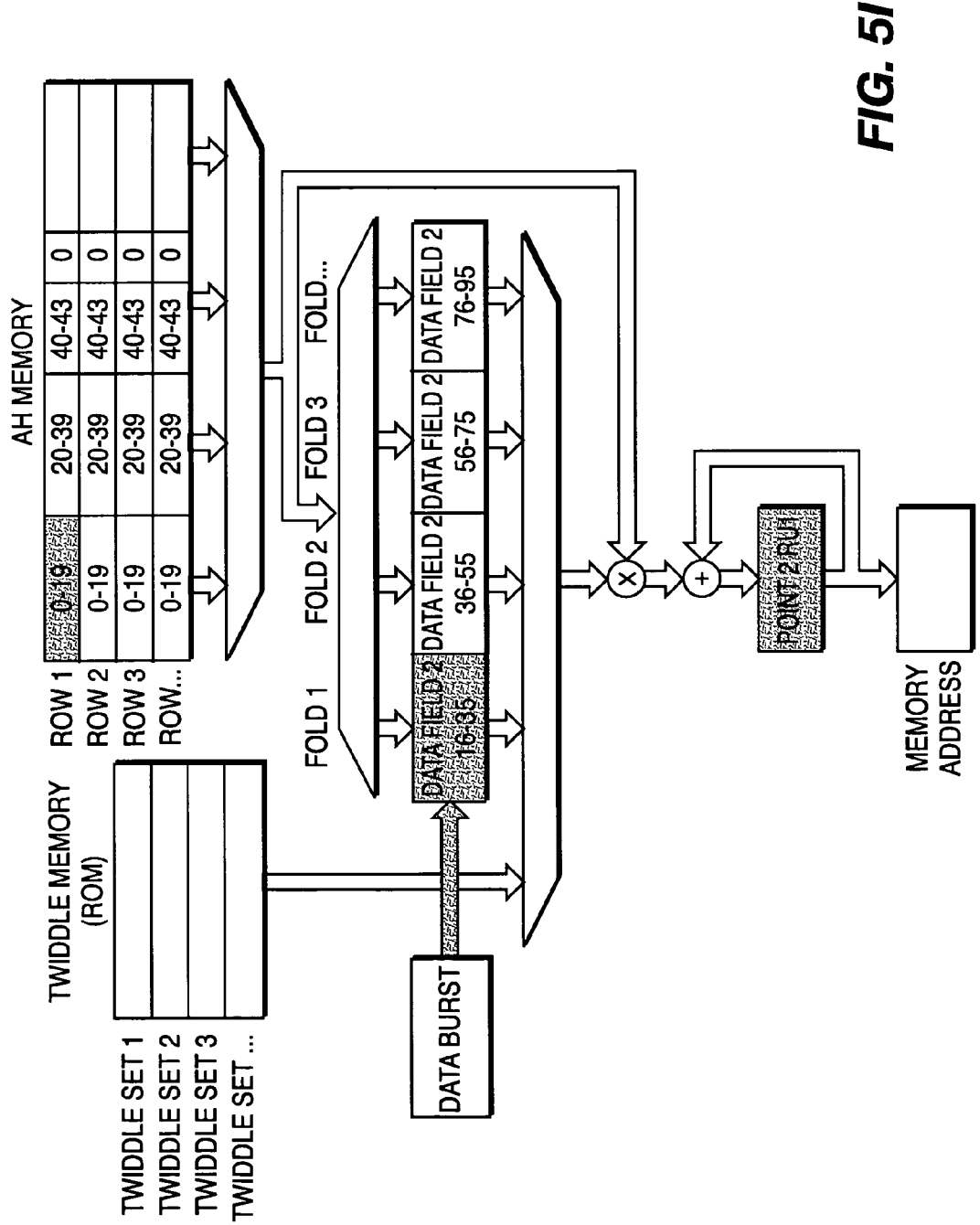

FIG. 5G shows one value of the r vector being shifted into the right side of the shift register while the first value put into the shift register is lost. FIG. 5H shows a second value of the r vector being shifted into the shift register while the second value put into the register is lost. FIG. 5I shows the first $A^H$ row being multiplied by the first fold of the newly shifted r vector and the result being stored into the accumulation register 59 just as in the first calculation of the first $A^H r$ row block. This process continues for every fold of every valid $A^H$ row block row for every one of the $A^H$ row blocks.

Figure 6A:
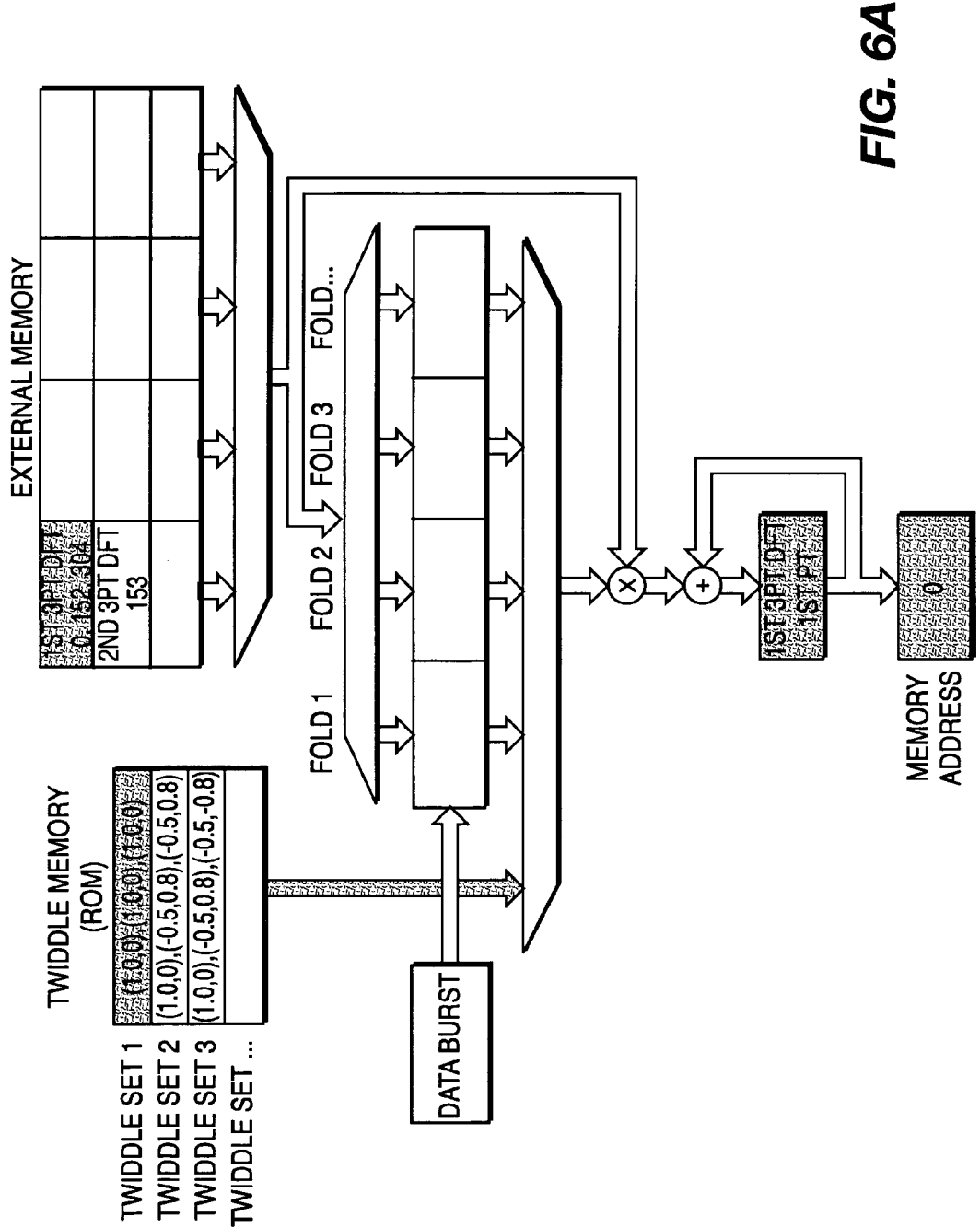
FIGS. 6A-6D show the mathematical engine of FIG. 1 performing the calculations required for a DFT.
Figure 6B:
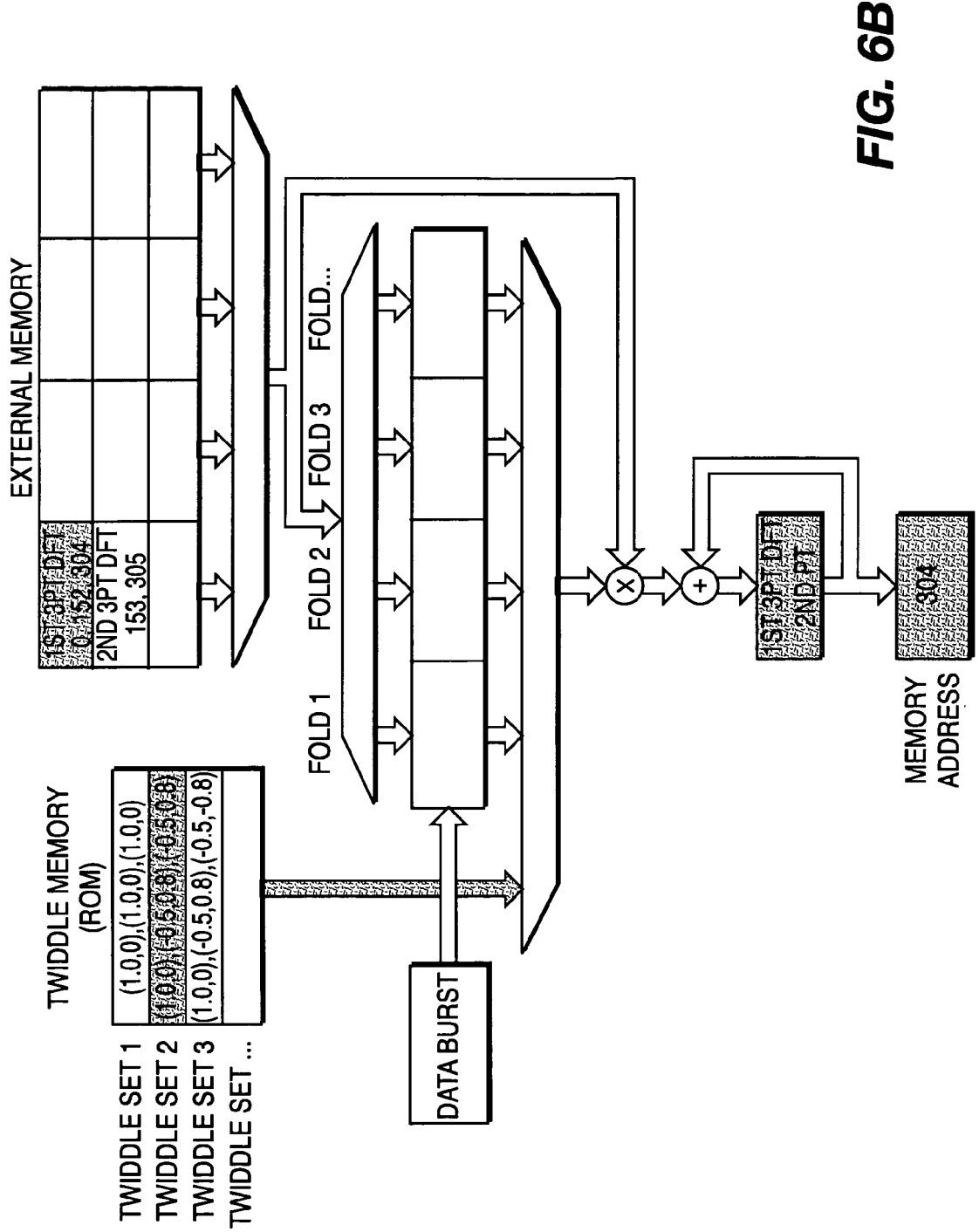
Figure 6C:
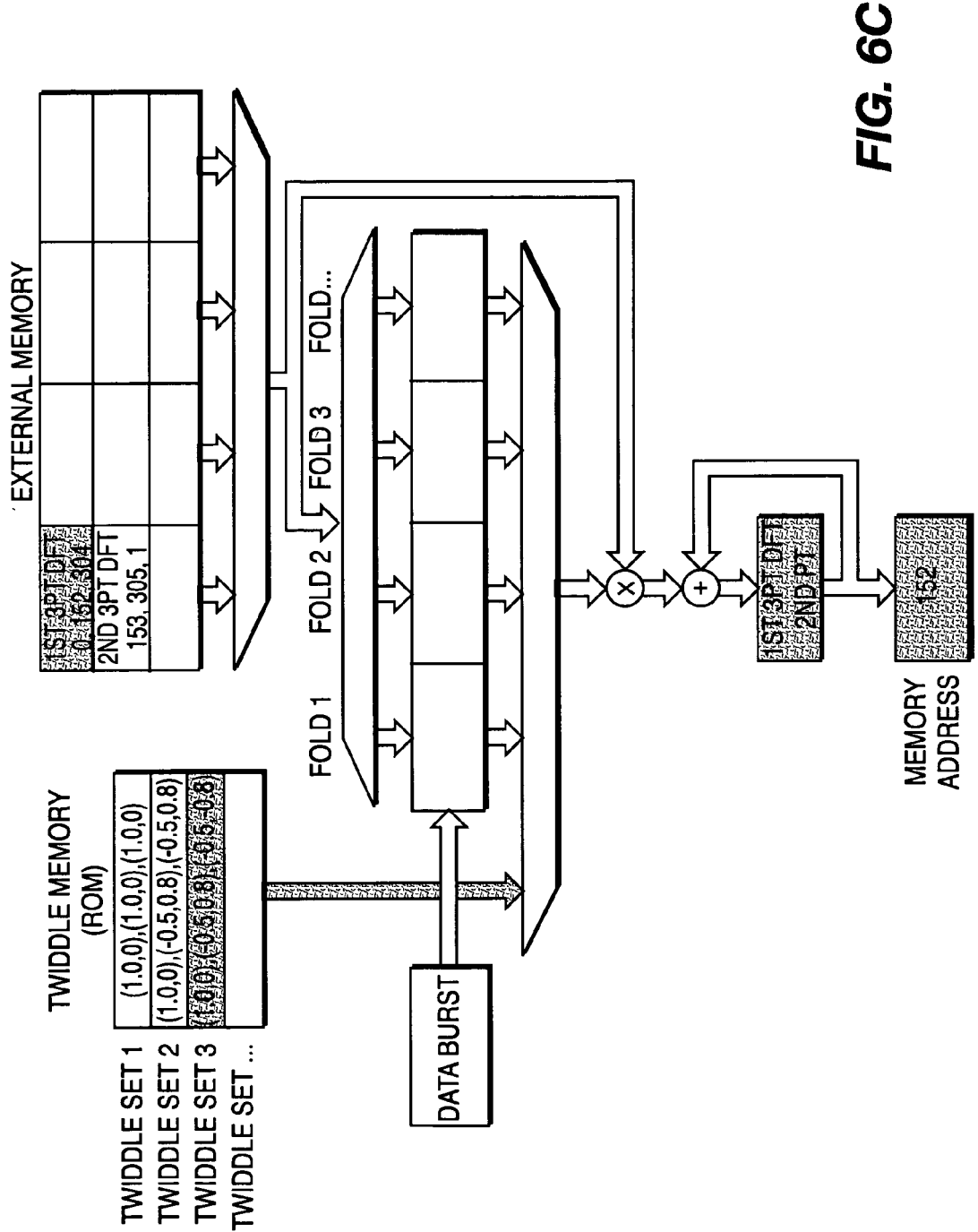

As a third example, the Steiner algorithm as performed by the mathematical engine of FIG. 1 will be described with reference to FIGS. 6A-6D. The figures show the process of using the mathematical engine to do a 3 pt DFT for a 456 pt Steiner. FIGS. 6A-6C show the calculation of the first DFT, each figure showing a different clock. As shown, the first three addresses of the DFT were already loaded into the a memory serially so they can all be accessed at once in a parallel manner, through the PPDIS 31, (in FIG. 1). The Twiddle Factors used for the DFT are inputted through the SPDIS 36, (in FIG. 1).

In each of these three clocks, the first DFT inputs at addresses 0, 152, and 304 are multiplied by one of the three twiddle factor sets unique to that point of the DFT. The results of these three calculations are external to the mathematical engine in FIG. 1.

In FIG. 6A the three points of Twiddle Set 1 are multiplied by the three points of DFT 1 and the result is stored externally. The first point of the second DFT is loaded into the next row of the memory. In FIG. 6B the three points of Twiddle Set 2 are multiplied by the three points of DFT 1 and the result is stored externally. The second point of the second DFT is loaded into the next row of the memory. In FIG. 6C the three points of Twiddle Set 3 are multiplied by the three points of DFT 1 and the result is stored externally. The third point of the second DFT is loaded into the next row of the memory.

Figure 6D:
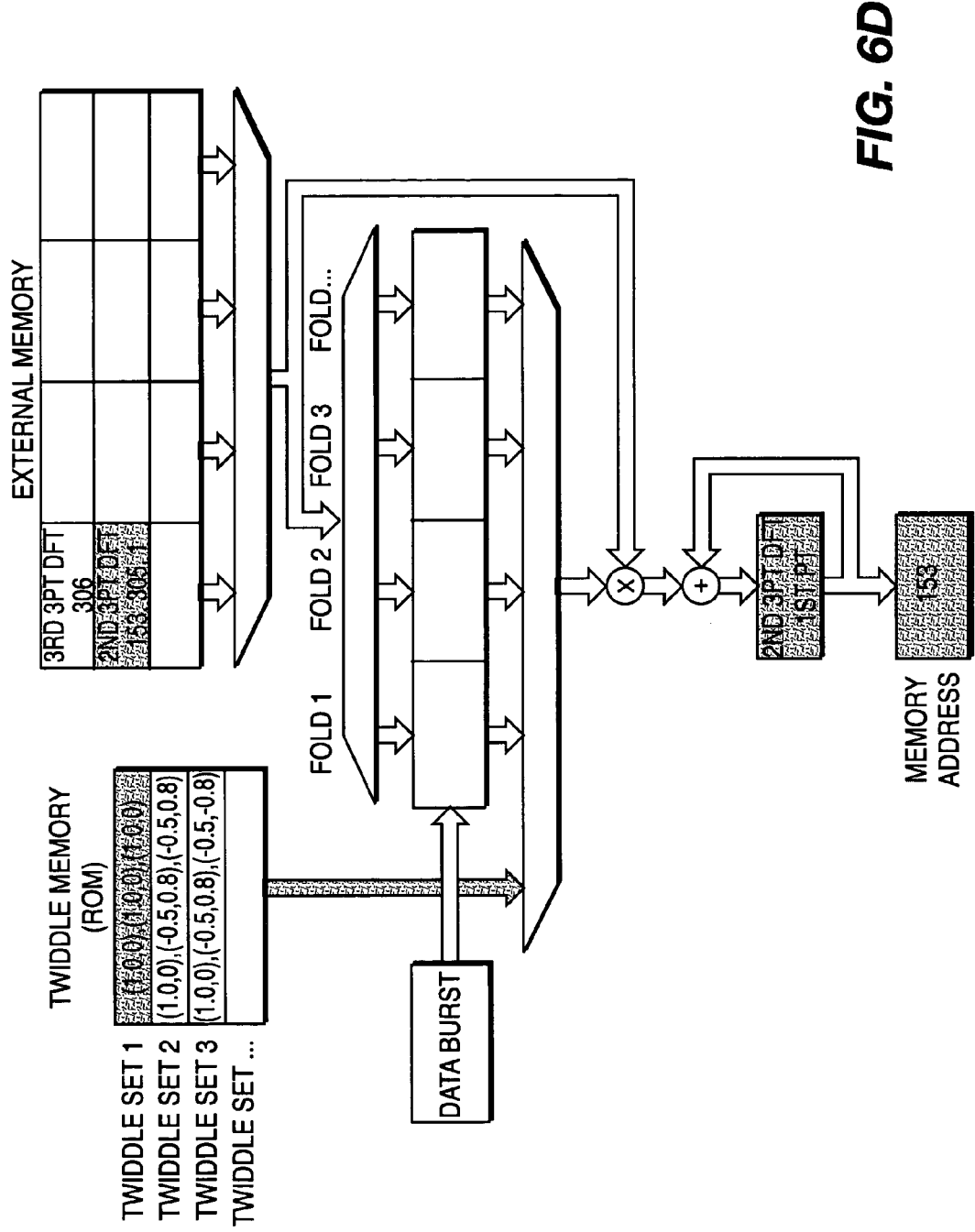

FIG. 6D shows how the first point of the next DFT is calculated with the first twiddle factor set and the other two sets will follow in the following clocks. A 64-point DFT is done in a slightly different manner where the multiplication of each DFT set by the twiddle set takes four consecutive clocks that are accumulated together before storage.

In FIG. 6D the three points of Twiddle Set 1 are multiplied by three points of DFT 2 and the result is stored externally. The first point of the third DFT is loaded into the next row of the memory. This multiplication is continued for every one of the 3 pt DFTs for all the three twiddle factor sets. The other DFTs are done similarly 8 pts with 8 twiddle sets, 19 pts with 19 twiddle sets, and 64 pts with 64 twiddle sets.

Figure 7A:
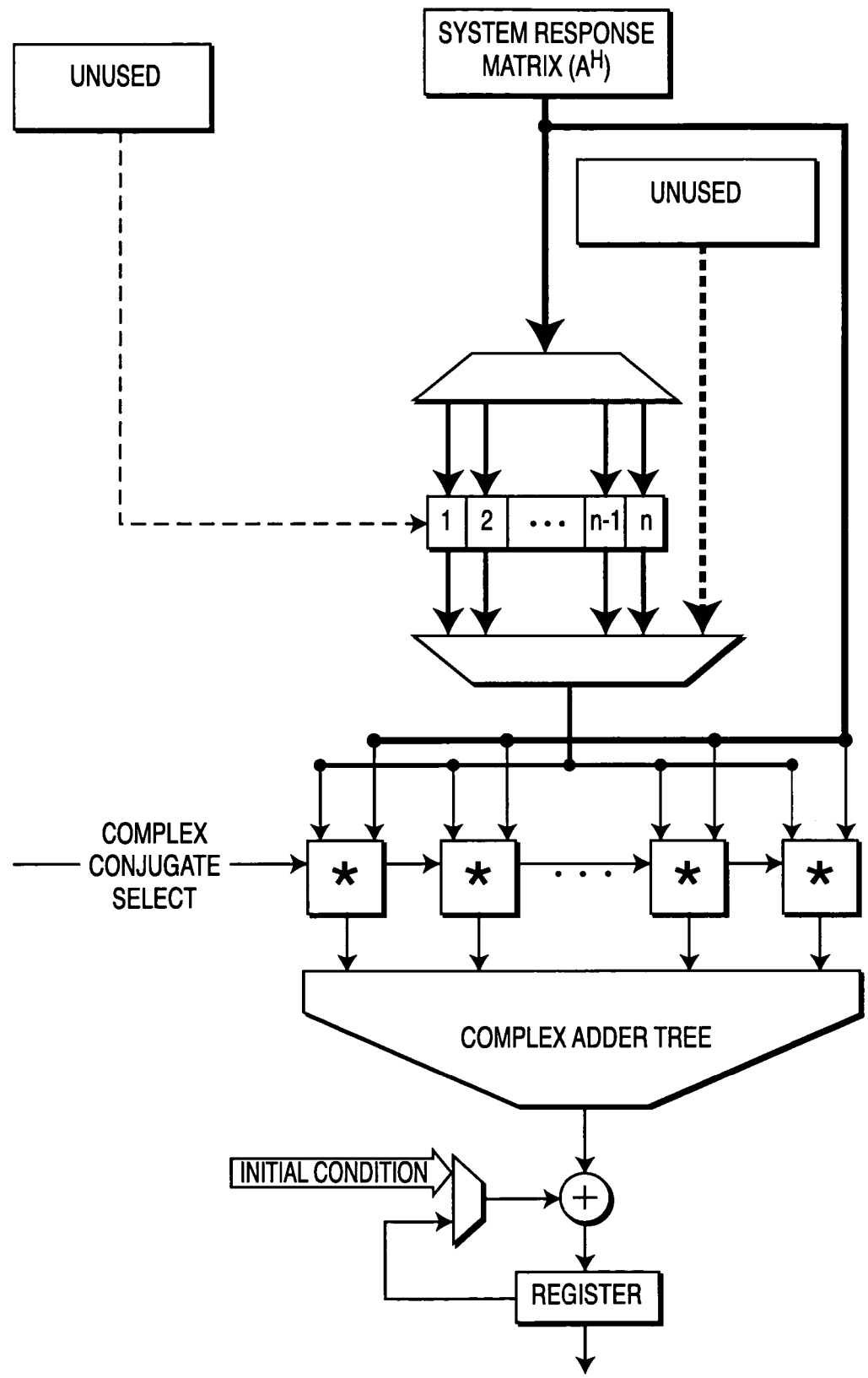
FIGS. 7A-7C illustrate selective use of the input sources.
Figure 7B:
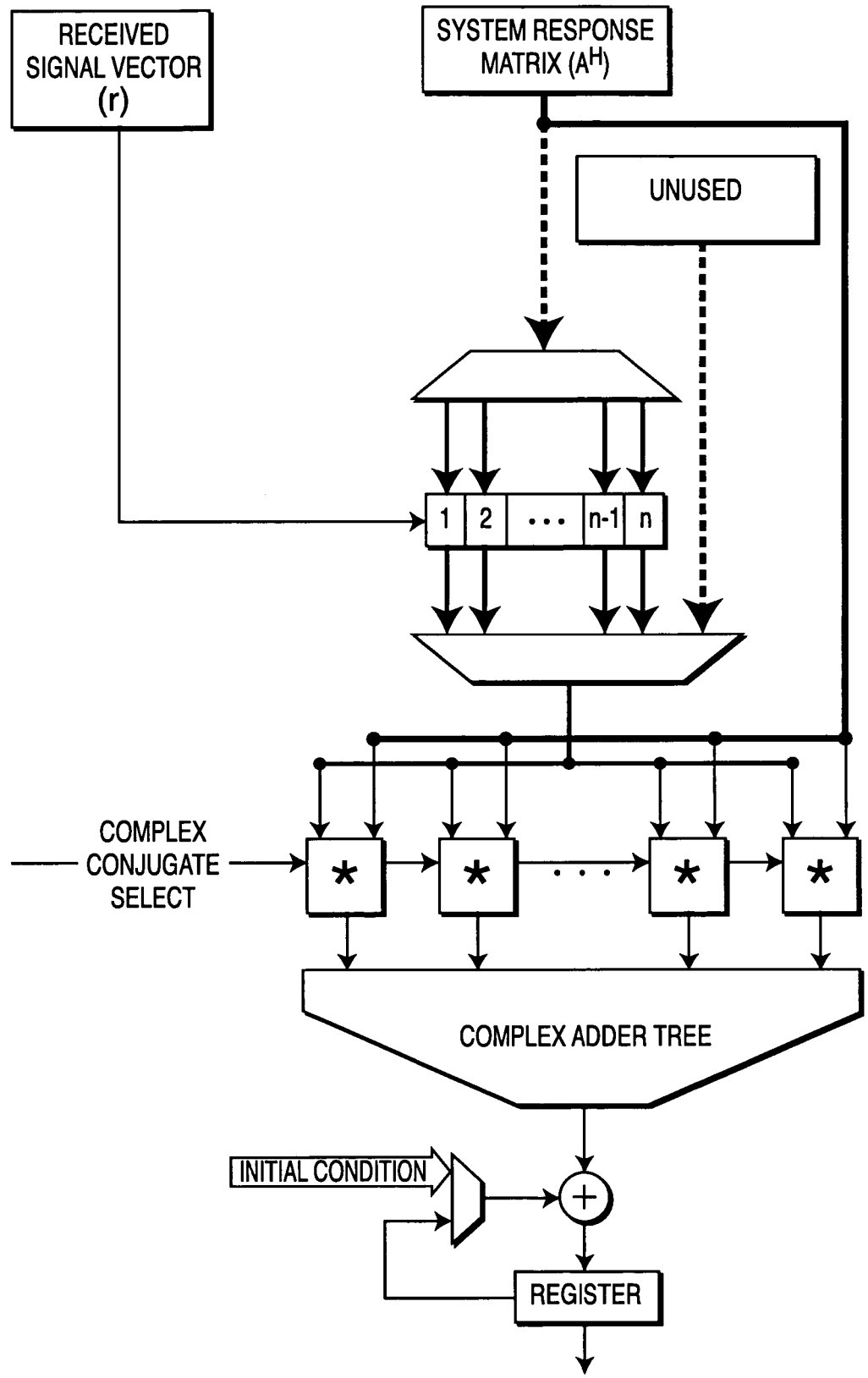
Figure 7C:
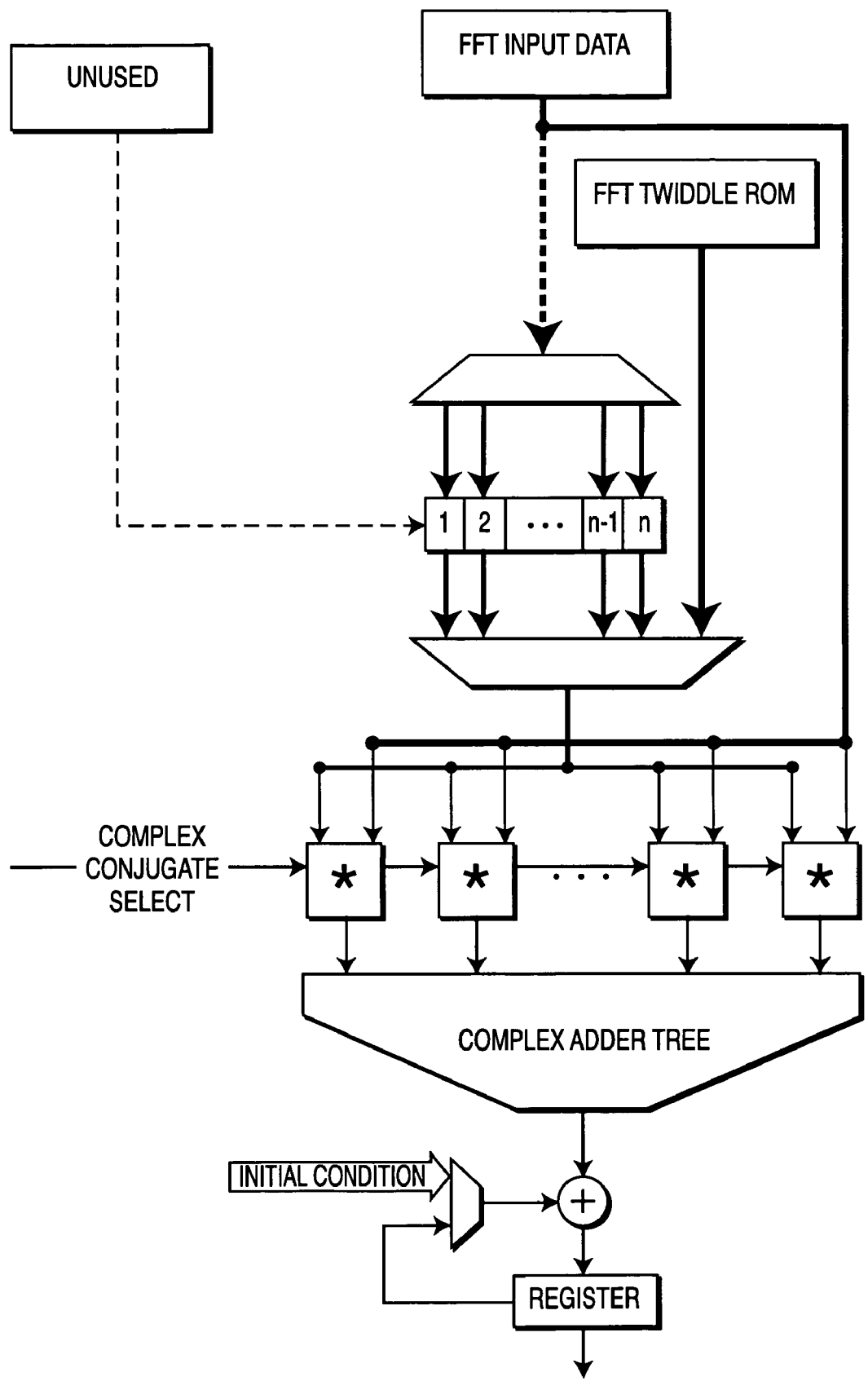

Referring to FIGS. 7A-7C, it can seen that selective enablement of inputs into the mathematical engine of the present invention permits the mathematical engine to perform $A^H A$, $A^{'}$ and Steiner functions. As shown in FIG. 7A, for the $A^H A$ function only the PPDIS input is used to provide the system response matrix ($A^H$) during the $A^H A$ operation; the system response matrix is multiplied by it's complex conjugate transpose value. With the use of the parallel loading capability of the shift register and because the complex multiplier array includes the capability to conjugate one of it's inputs, each point is calculated in x clock cycles (where $1 \leq x \leq n$, n being the maximum # of folds), depending on how many folds are required.

Referring to FIG. 7B, for the $A^H r$ function, the PPDIS provides the system response matrix ($A^H$). Additionally, the serial input is used to provide the data fields of the received vector (r) during the $A^H r$ operation. The system response matrix $A^H$ is multiplied by the data fields of the received vector r for a timeslot. With the use of serial load capability of the shift register, the data field is loaded into the shift register while the system response matrix is provided to the primary parallel input. Each element of the resulting vector is calculated in x clock cycles (where $1 \leq x \leq n$, n being the maximum # of folds), depending on how many folds are required.

As shown in FIG. 7C for the Steiner operation (FFT), the PPDIS provides the FFT input data set and the SPDIS provides the FFT twiddle factors. During the FFT operations, in an m-point FFT, the appropriate m-points of the data set are provided by the PPDIS to the complex multiplier array, while the appropriate FFT Twiddle factors are provided by the SPDIS.

What is claimed is:

1. A calculation unit comprising:
a parallel output N-fold shift register configured to receive data elements to be processed where the elements are received in respective shift register folds having a predetermined fold size whereby up to N elements can be stored for parallel output from the N-fold shift register at one time;
a processor configured with a predetermined capacity for processing data vector elements and including an adder tree using a plurality of arithmetic logic unit (ALU) circuits, the processor configured to accept the output of the shift register and to provide a data output; and
the N-fold shift register configured with a selectable initial position for a data vector which exceeds the capacity of the processor and has more than N elements so as to selectively output data elements based upon the capacity of the processor.

2. The calculation unit of claim 1, further comprising a multiplexer configured to receive selectively output data elements from the parallel output N-fold shift register and to selectively provide such data elements from the parallel output N-fold shift register as input to the processor ALU circuits.

3. The calculation unit of claim 2 wherein the parallel output N-fold shift register has both serial and parallel inputs further comprising an enable circuits configured to selectively enable the shift register serial and parallel inputs.

4. The calculation unit of claim 1, wherein said processor is configured to process data elements that includes both real and imaginary components.

5. The calculation unit of claim 4 further comprising:
a memory configured to receive data elements for complex resolution;
a store configured to store an operational factor for a complex function;
a multiplexer configured to selectively receive data elements from the parallel output N-fold shift register via the memory or the store;
the processor ALU circuits configured as a processing array circuit, for processing data elements from selected elements locations stored by the memory and data output from the multiplexer; and
an accumulator circuit configured to receive an output from the adder tree and to provide an accumulated complex output.

6. The calculation unit of claim 5 configured with a twiddle factor as the operational factor, for performing discrete Fourier transforms (DFTs), wherein the multiplexer is configured to receive its input from the store when using the twiddle factor.

7. A communication device including the calculation unit of claim 5 configured to facilitate processing of wireless communication signals wherein the parallel output N-fold shift register has more than two folds.

8. The calculation unit of claim 1, further comprising a selectable memory configured to serve as an input source for the parallel output N-fold shift register and an enablement circuit to selectively control said input memory and said selectable memory depending upon the desired mathematical calculation.

9. A communication device including the calculation unit of claim 1 configured to facilitate processing of wireless communication signals wherein the parallel output N-fold shift register has more than two folds.

10. The calculation unit of claim 1 wherein the predetermined fold size of the shift register folds is twenty data values.

11. A calculation unit for performing a plurality of different types of calculations, the calculation unit comprising:
an input memory configured to store data elements;
a parallel output N-fold shift register configured to receive data elements to be processed where the elements are received in respective shift register folds having a predetermined fold size whereby up to N elements can be stored for parallel output from the N-fold shift register at one time;
a multiplexer configured to receive the output from said shift register and to provide an output to an adder tree;
the adder tree comprising a plurality of arithmetic logic units (ALUs); and
a selection circuit configured to selectively enable the shift register, the multiplexer and the input memory to apply selected data elements to the adder tree based on the type of calculation performed.

12. The calculation unit of claim 11, further comprising, at least one selectable memory having a data width of at least a multiple of a data width of the adder tree.

13. The calculation unit of claim 11 wherein the parallel output N-fold shift register is configured with both serial and parallel inputs, the selection circuit is configured to selectively enable the shift register serial and parallel inputs, and the adder tree is configured to process data elements that includes both real and imaginary components.

14. A communication device including the calculation unit of claim 13 configured to facilitate processing of wireless communication signals wherein the parallel output N-fold shift register has more than two folds.

15. The calculation unit of claim 11, further including an accumulation circuit for receiving and selectively accumulating each output from the adder tree based on the type of calculation performed.

16. A communication device including the calculation unit of claim 11 configured to facilitate processing of wireless communication signals wherein the parallel output N-fold shift register has more than two folds.

17. The calculation unit of claim 11 wherein the predetermined fold size of the shift register folds is twenty data values.

18. A method of processing wireless communication signal data vectors having greater than N data elements, where N is greater than two, using a parallel output N-fold shift register configured to receive data elements to be processed where data elements are received in respective shift register folds of a predetermined fold size whereby up to N elements can be stored for parallel output from the N-fold shift register at one time and a processor that includes an adder tree associated with a plurality of arithmetic logic unit (ALU) circuits that define a processor capacity comprising by selectively controlling the shift register to selectively output data elements based upon the capacity of the processor and using the processor to process output data elements of the shift register to thereby provide processing of data vectors having greater than N elements.

19. The method of claim 18 further comprising using a multiplexer to receive selectively output data elements from the parallel output N-fold shift register and to selectively provide such data elements from the parallel output N-fold shift register to the processor ALU circuits.

20. The method of claim 19 wherein the parallel output elements shift register has both serial and parallel inputs further comprising selectively enabling the shift register serial and parallel inputs based on the type of data processing computations to be performed.

21. The method of claim 20 wherein an input memory is associated with the parallel output elements shift register and the processor ALU circuits, further comprising selectively enabling input to the shift register and the processor ALU circuits from the input memory based on the type of calculation performed.

22. The method claim 21 further comprising selectively enabling input from a secondary input memory to the processor based on the type of calculation performed.

23. The method of claim 22 wherein the data elements which are processed are data elements that includes both real and imaginary components.

24. The method of claim 18 wherein the predetermined fold size of the shift register folds is twenty data values and data elements of twenty values are received in the respective shift register folds.

* * * * *

UNITED STATES PATENT AND TRADEMARK OFFICE
CERTIFICATE OF CORRECTION

PATENT NO. : 7,430,577 B2
APPLICATION NO. : 10/670062
DATED : September 30, 2008
INVENTOR(S) : Buchert et al.

It is certified that error appears in the above-identified patent and that said Letters Patent is hereby corrected as shown below:

TITLE PAGE IN THE ABSTRACT

At section (57), ABSTRACT, page 1, right column, line 1, after the word "types" delete "if" and insert therefor --of--.

IN THE SPECIFICATION

At column 1, line 30, before the words "of room" delete "alot" and insert therefor --a lot--.

At column 2, line 16, after the word "diagram" insert --of--.

At column 2, line 46, before the words "on the" delete "dependant" and insert therefor --dependent--.

At column 3, line 25, after the word "not" delete "limited, to" and insert therefor --limited to,--.

At column 4, line 19, after the word "with" delete "an".

At column 4, line 38, after the word "Length" delete "(W)-1" and insert therefor --(W-1)--.

At column 4, line 52, after the words "inside the" delete "doted" and insert therefor --dotted--.

At column 6, line 36, after the word "fold" insert --of--.

At column 7, line 7, before the word "memory" delete "a".

At column 7, line 40, after the words "it can" insert --be--.

At column 7, line 43, before the words "and Steiner" delete "$A^r$" and insert therefor --$A^H r$--.

UNITED STATES PATENT AND TRADEMARK OFFICE
CERTIFICATE OF CORRECTION

PATENT NO. : 7,430,577 B2
APPLICATION NO. : 10/670062
DATED : September 30, 2008
INVENTOR(S) : Buchert et al.

It is certified that error appears in the above-identified patent and that said Letters Patent is hereby corrected as shown below:

At column 7, line 46, before the word "complex" delete "it's" and insert therefor --its--.

At column 7, line 49, before the word "inputs" delete "it's" and insert therefor --its--.

IN THE CLAIMS

At claim 3, column 8, line 31, after the word "enable" delete "circuits" and insert therefor --circuit--.

At claim 18, column 10, line 10, after the word "comprising" delete "by".

Signed and Sealed this

Sixth Day of October, 2009

David J. Kappos
*Director of the United States Patent and Trademark Office*